(12) United States Patent
Oomoto et al.

(10) Patent No.: US 9,597,920 B2
(45) Date of Patent: Mar. 21, 2017

(54) WRITING INSTRUMENT OR APPLICATOR HAVING RESIN MOLDED PARTS

(71) Applicant: MITSUBISHI PENCIL COMPANY, LIMITED, Tokyo (JP)

(72) Inventors: Kei Oomoto, Yokohama (JP); Yumi Maejima, Yokohama (JP); Daisaku Morimoto, Yokohama (JP); Kyo Nakayama, Yokohama (JP)

(73) Assignee: MITSUBISHI PENCIL COMPANY, LIMITED, Shaingawa-ku (JP)

( * ) Notice: Subject to any disclaimer, the term of this patent is extended or adjusted under 35 U.S.C. 154(b) by 184 days.

(21) Appl. No.: 14/467,516

(22) Filed: Aug. 25, 2014

(65) Prior Publication Data

US 2015/0063893 A1    Mar. 5, 2015

(30) Foreign Application Priority Data

Sep. 3, 2013  (JP) ................................. 2013-182186
Jul. 10, 2014 (JP) ................................. 2014-142300

(51) Int. Cl.
| | |
|---|---|
| *B43K 21/22* | (2006.01) |
| *B43K 7/12* | (2006.01) |
| *B43K 8/02* | (2006.01) |
| *B43K 8/04* | (2006.01) |
| *B43K 21/00* | (2006.01) |

(Continued)

(52) U.S. Cl.
CPC ............ *B43K 21/22* (2013.01); *B29C 45/162* (2013.01); *B43K 7/12* (2013.01); *B43K 8/022* (2013.01); *B43K 8/04* (2013.01); *B43K 21/00* (2013.01); *B43K 21/16* (2013.01); *B43K 23/008* (2013.01); *B43K 24/086* (2013.01); *B43K 25/02* (2013.01); *B43K 29/00* (2013.01); *B43K 29/004* (2013.01); *B43K 29/02* (2013.01); *B43L 19/0068* (2013.01); *A45D 34/042* (2013.01); *B29L 2031/7252* (2013.01)

(58) Field of Classification Search
CPC combination set(s) only.
See application file for complete search history.

(56) References Cited

U.S. PATENT DOCUMENTS 7,588,383 B2 *  9/2009  Hokimoto ............ B43K 21/027
                                                     401/92
7,654,763 B2 *  2/2010  Izawa .................... B43K 21/22
                                                     401/92

FOREIGN PATENT DOCUMENTS

| JP | 2004-291365 A | 10/2004 |
|---|---|---|
| JP | 2005-193444 A | 7/2005 |

(Continued)

*Primary Examiner* — David Walczak
(74) *Attorney, Agent, or Firm* — Westerman, Hattori, Daniels & Adrian, LLP

(57) ABSTRACT

Provided is a writing instrument or an applicator using resin parts formed, by way of two-color molding, to have an optimal guiding clearance between slide members. A plurality of resin molded parts is included. At least one of the plurality of resin molded parts is formed as a primary molding, and at least another one of the resin molded parts is formed as a secondary molding, by way of two-color molding, using a portion of a surface of the primary molding. The primary molding and the secondary molding are separated to be used as independent members. In this case, the primary molding and the secondary molding are preferably configured to slide against each other by each separating portion.

5 Claims, 33 Drawing Sheets

(51) Int. Cl.
  *B43K 21/16*   (2006.01)
  *B43K 23/008*  (2006.01)
  *B43K 24/08*   (2006.01)
  *B43K 25/02*   (2006.01)
  *B43K 29/00*   (2006.01)
  *B43K 29/02*   (2006.01)
  *B43L 19/00*   (2006.01)
  *B29C 45/16*   (2006.01)
  *A45D 34/04*   (2006.01)
  *B29L 31/00*   (2006.01)

(56) References Cited

FOREIGN PATENT DOCUMENTS

| | | |
|---|---|---|
| JP | 2009-160736 A | 7/2009 |
| JP | 2010-23229 A | 2/2010 |

* cited by examiner

WRITING INSTRUMENT OR APPLICATOR HAVING RESIN MOLDED PARTS

BACKGROUND

Technical Field

The present invention relates to a writing instrument or an applicator including a plurality of resin molded parts formed by way of two-color molding.

Related Art

In the related art, a synthetic resin material is eagerly used for components constituting a writing instrument or an applicator. Most components of relatively low-price writing instruments or applicators such as body cylinders and caps are produced by injection molding using a resin material.

For example, a two-color molding method, in which a soft elastomer resin is secondarily formed around a body cylinder formed as a primary molding, has been widely used. In this manner, a grip part can be integrally formed with the body cylinder with ease to improve productivity.

Further, the two-color molding method can effectively be used for attaching, for example, a decorating part with a different color to a portion of the surface of a primarily formed member to differentiate the design of products.

The two-color molding method has been widely used for the writing instruments or applicators in the related art. However, all of those products have a relatively simple configuration in which a secondary molding is integrally formed on a surface of a primary molding (for example, see Japanese Patent Application Laid-Open Nos. 2004-291365 (Patent Literature 1) and 2005-193444 (Patent Literature 2)).

In recent years, writing instruments or applicators configured with many assembled resin parts have been provided. For example, the applicant provides a mechanical pencil in the market that can rotate a writing lead (refill lead) using writing pressure. This mechanical pencil includes a rotational drive mechanism for rotationally driving the writing lead.

The rotational drive mechanism included in the mechanical pencil includes a mechanism, for example, that mechanically allows parts each formed of a resin material to mutually slide in the axial direction every time writing pressure is applied to the writing lead. In this case, in order to form each part to have no play (looseness) in the sliding portion and to make relative movement smoothly, an extremely precise processing technique and strict control are required.

SUMMARY

The present invention is directed to performing forming, by way of two-color molding, to provide, for example, an optimal guiding clearance between slide members configured to slide against each other. An object of the invention is to provide, by using the two-color molding method, a writing instrument or an applicator having improved operational reliability.

A writing instrument or an applicator according to an embodiment of the present invention for solving the problem includes a plurality of resin molded parts. At least one of the resin molded parts is formed as a primary molding and at least another one of the resin molded parts is formed as a secondary molding, by way of two-color molding, using a portion of the surface of the primary molding. The primary molding and the secondary molding are separated and used as independent members.

In this case, the primary molding and the secondary molding are preferably configured to slide against each other by each separating portion.

Additionally, the primary molding and the secondary molding are formed of a same material, preferably, POM (polyacetal).

In a preferable example, a guide recess is formed on either one of the separating portions of the primary molding and the secondary molding and a guide protrusion is formed on the other one of the separating portions. The guide recess and the guide protrusion are configured to mutually slide.

Further, the mechanical pencil according to the example to which the present invention is applied includes a rotational drive mechanism for rotationally driving a rotatable cam based on the writing pressure that the writing lead receives and is configured to transmit the rotational motion of the rotatable cam to the writing lead. The rotational drive mechanism includes a holder member, formed by way of resin mold, configured to support the rotatable cam rotatably and movably in the axial direction and a sliding member, formed by way of resin mold, which is fitted in the holder member and configured to push the rotatable cam forward in the axial direction. The rotational drive mechanism is also configured to rotate the rotatable cam by axially moving the rotatable cam based on the writing pressure that the writing lead receives. A columnar piece that functions as an axially long guide protrusion is formed on the holder member and a guide portion that functions as a guide recess corresponding to the columnar piece is formed on the sliding member so as to fit the sliding member slidably in the columnar piece. A cushion spring configured to produce a bias force to push the rotatable cam forward in the axial direction is arranged making contact with the sliding member. The columnar piece of the holder member is configured as either one of the primary molding and the secondary molding and the sliding member including the guide portion corresponding to the columnar piece is configured as the other one of the primary molding and the secondary molding.

Further, in a preferable embodiment, a plurality of columnar pieces formed on the holder member is arranged so as to surround the sliding member in the center, and in a portion in the longitudinal direction of each columnar piece, a step portion is formed to reduce the width in the circumferential direction of the columnar piece.

In another preferable embodiment, a plurality of columnar pieces formed on the holder member is arranged so as to surround the sliding member in the center, and each columnar piece is formed to have a tapered shape reducing the width in the circumferential direction rearward along the axial direction of the columnar piece.

Further, in another preferable embodiment, a plurality of columnar pieces formed on the holder member is arranged so as to surround the sliding member in the center, and each columnar piece is formed in a tapered shape so as the inner distance between the opposing columnar pieces increases rearward along the axial direction of the columnar piece.

In the preferable embodiment of the rotational drive mechanism described above, a large number of cams are continuously formed along a ring shape on each of upper and lower faces of the rotatable cam where the upper and lower faces are perpendicular to the axial direction of the rotatable cam. The holder member includes a first fixed cam and a second fixed cam which are arranged to face each other via the upper and lower cams of the rotatable cam. The first fixed cam meshes with the upper cam of the rotatable cam so as to rotationally drive the rotatable cam in one direction as the rotatable cam retreats in the axial direction, and the second fixed cam meshes with the lower cam of the rotatable cam so as to rotationally drive the rotatable cam in the one direction as the rotatable cam moves forward in the axial direction.

Further, in a preferable example in which the present invention is applied to a fluid applicator such as makeup tools, the fluid applicator includes a shaft main body configured to have a fluid storage tank inside and to keep a fluid discharge port sealed with a plug body before use, a front body holding a writing tip and coupled to the shaft main body via a stopper before use but configured to move when used, by removing the stopper, in the axial direction by the length of the stopper to be coupled to the shaft main body, and a fluid communication tube which is arranged inside the front body and configured to strike the plug body provided on a mouth portion arranged at a forward opening of the shaft main body to remove the plug body by moving toward the shaft main body so as to be coupled thereto, thereby supplying the fluid to the writing tip from the storage tank. The mouth portion is configured as either one of a primary molding and a secondary molding and the plug body is configured as the other one of the primary molding and the secondary molding.

Further, in a preferable example in which the present invention is applied to a knock-type writing instrument which projects a writing material from a base part by knocking a knocking part, a knock-type feeding mechanism is configured with a heart cam rotor in which a grooved heart cam is formed and a heart cam rotor support including a contactor contacting the heart cam formed in the heart cam rotor. The knock-type feeding mechanism is configured to alternately project the writing material from the base part and retreat the writing material into the base part by repeating the knocking. The heart cam rotor constituting the knock-type feeding mechanism is configured as either one of a primary molding and a secondary molding and the heart cam rotor support constituting the knock-type feeding mechanism is configured as the other one of the primary molding and the secondary molding.

Further, in a preferable example in which the present invention is applied to a mechanical pencil including an eraser receiving unit which feeds an eraser from a tail end portion of a body cylinder by operating a feeding knob, the eraser receiving unit includes the feeding knob which has a cut groove along the axial direction and rotates about the axis and an eraser holder which is arranged in the feeding knob to hold the eraser and is movable in the axial direction along the cut groove. An engagement projection formed on the eraser holder is threadedly arranged in a threaded groove of a feeding thread spirally formed on the inner circumferential surface which accommodates the eraser receiving unit. The eraser holder constituting the eraser receiving unit is configured as either one of a primary molding and a secondary molding and the feeding knob constituting the eraser receiving unit is configured as the other one of the primary molding and the secondary molding.

Further, in a preferable example in which the present invention is applied to a mechanical pencil capable of projecting a pipe end, the mechanical pencil includes an opening formed at a forward end to project the pipe end for a writing lead and a slider cover allowing a slider attached with the pipe end to slide therein. A guide groove is formed along the axial direction on the slider cover, and a projection which moves along inside the guide groove is formed on the slider outward from the axis. The slider cover is configured as either one of a primary molding and a secondary molding and the slider is configured as the other one of the primary molding and the secondary molding.

In this case, the slider may preferably be configured such that the outer diameter of the body of the slider in the rear end is larger than that in the front end.

Further, in another embodiment of a writing instrument or an applicator having a preferable configuration, the writing instrument or the applicator may include a plurality of resin molded parts and be configured such that at least one of the resin molded parts is formed as a primary molding, and at least the rest of the resin molded parts are formed as a plurality of multiple moldings formed along the surface of the primary molding by multi-color molding. The primary molding and the multiple moldings are separated and can be used as independent members.

According to the writing instrument or the applicator according to an embodiment of the present invention, the secondary molding is formed, by way of two-color molding, using a portion of the surface of the primary molding, and the primary molding and the secondary molding are separated after the two-color molding and used as independent members.

Thus, a portion of the secondary molding separated from the primary molding is formed to have a shape transferred from a portion of the surface of the primary molding.

Thus, by using the separating portions of the primary molding and the secondary molding as sliding portions by which the primary molding and the secondary molding move against each other, the guiding clearance between the two moldings can be provided to be as small as possible so as to obtain a small play (looseness) between the slide members in the reciprocating motion.

Further, by forming the primary molding and the secondary molding using a same material such as POM, it is easy to separate the two moldings after two-color molding and the sliding between the two moldings is provided with good lubrication (slidability).

DETAILED DESCRIPTION

An example of using a writing instrument or an applicator according to an embodiment of the present invention for a mechanical pencil configured to gradually rotate a writing lead in conjunction with a writing operation will be described based on an embodiment illustrated in the figures.

Note that, in each of the drawings as illustrated below, the same parts or parts having the same function are referred to by the same reference signs, but reference signs are assigned to typical parts in some drawings, and the detailed structures may be described with reference to reference signs used in other drawings for the sake of brevity.

Figure 1:
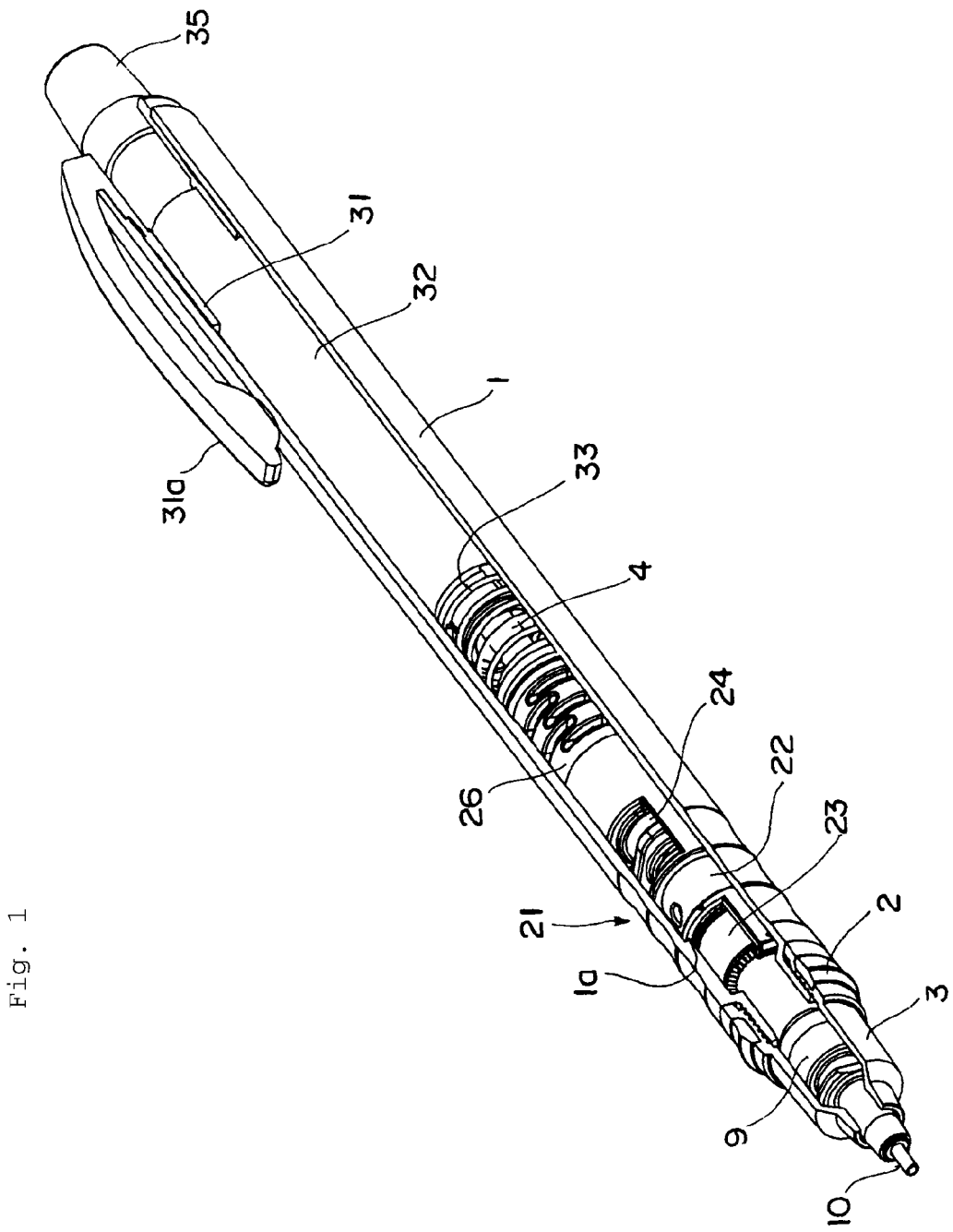
FIG. 1 is a partially cut away perspective view of a general structure of an example in which the present invention is applied to a mechanical pencil.
Figure 2:
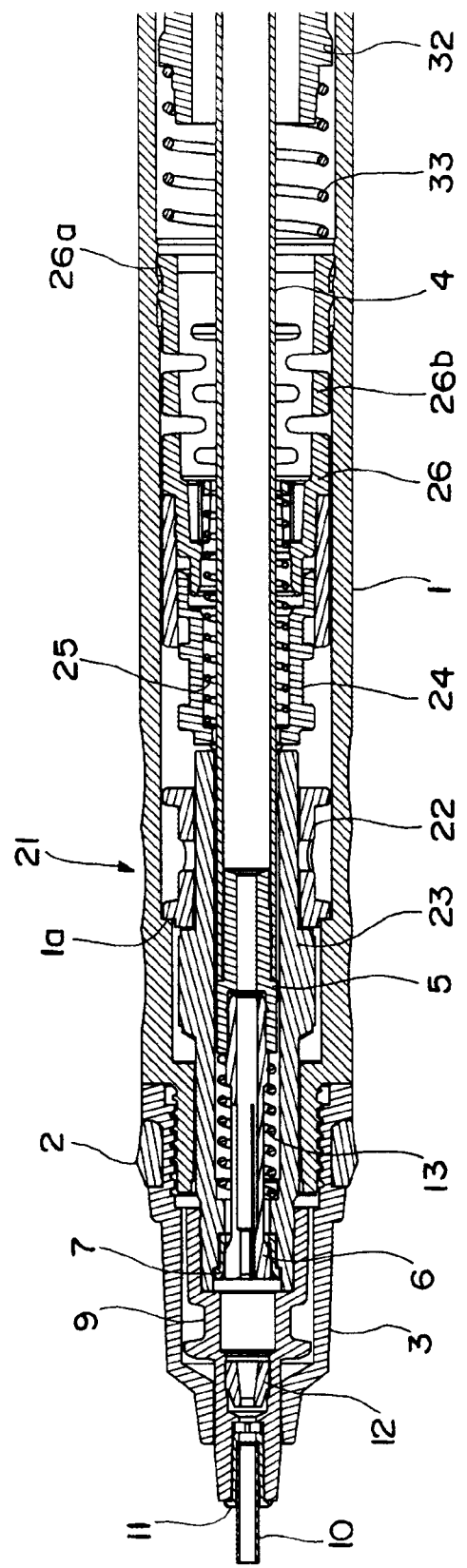
FIG. 2 is a sectional view similarly illustrating a first half part of the mechanical pencil.
Figure 4:
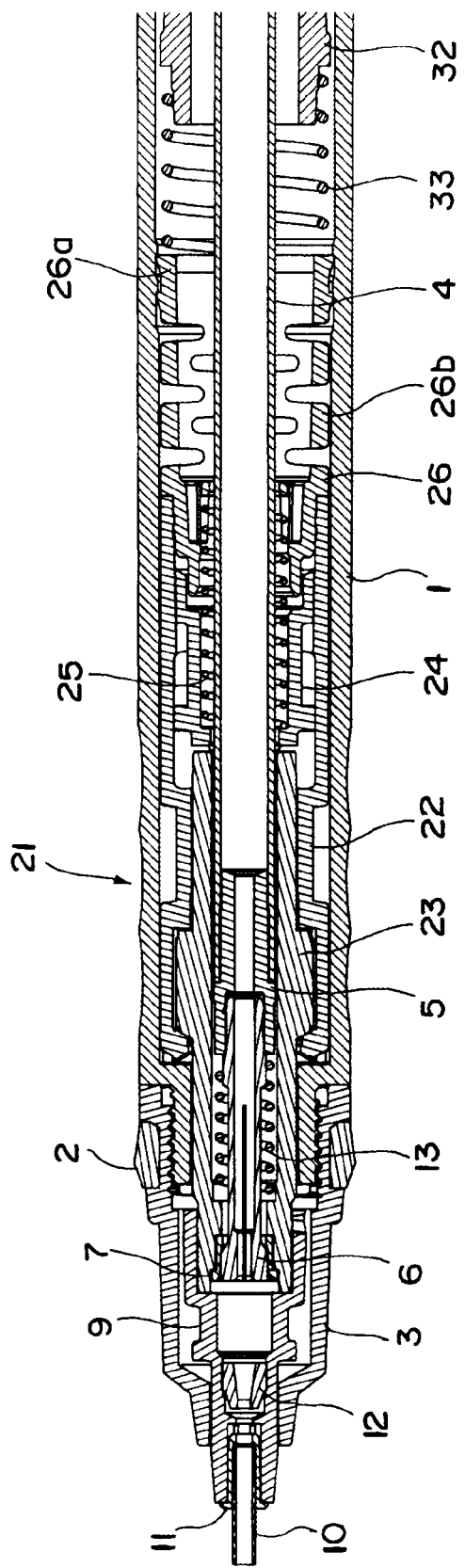
FIG. 4 is a sectional view of the first half part of the mechanical pencil rotated by 90 degrees from the state illustrated in FIG. 2.

First, as illustrated in FIGS. 1, 2, and 4, a base member 3 attached with a decorative ring 2 is threadedly coupled with a tip portion of a body cylinder 1 so as to be detachable from the body cylinder 1.

A cylindrical lead case 4 is accommodated along an axis of the body cylinder 1 and a short lead case connector 5 is attached to the tip portion of the lead case 4 to which a chuck 6 made of brass is coupled through the lead case connector 5.

In the chuck 6, a through hole (not shown) for the writing lead is formed along the axis. Further, a tip portion of the chuck 6 is circumferentially divided into a plurality of pieces (for example, three pieces) and the divided tip pieces are loosely fitted in a brass clamp 7 formed in the shape of a ring. Furthermore, the ring-shaped clamp 7 is fitted within a tip portion of a rotatable cam 23 which constitutes a portion of a rotational drive mechanism 21 arranged to surround the perimeter of the chuck 6.

A slider 9 which is accommodated in the base member 3 and whose front end portion projects from the base member 3 is fitted and attached to a front end portion of the rotatable cam 23 so as to cover the outer periphery of the rotatable cam 23. Further, a pipe end 10 which guides the writing lead is attached to the front end portion of the slider 9 via a pipe holder 11.

Furthermore, a holder chuck 12 made of rubber in which a through hole is formed in an axial portion is accommodated just behind the pipe end 10 in the inner periphery of the slider 9.

With the structure described above, a linear lead inserting hole is formed which reaches the pipe end 10 via the through hole formed in the chuck 6 which is linked to the lead case 4 and via the through hole formed along the axis of the holder chuck 12. The writing lead (not shown) is inserted into this linear lead inserting hole. Further, a coil-like chuck spring 13 is provided between the rotatable cam 23 and the lead case connector 5.

That is, the chuck spring 13 is accommodated with a front end portion of the chuck spring 13 abutting an annular step portion formed on an inner periphery of the rotatable cam 23, and with a rear end portion of the chuck spring 13 abutting a front end face of the lead case connector 5. Therefore, the chuck 6 retreats in the rotatable cam 23 by an expansion effect in the axial direction of the chuck spring 13 and is biased in a direction to accommodate its tip portion in the ring-shaped clamp 7, that is, in a direction to grip the writing lead.

The outside of the rotational drive mechanism 21 of a writing lead including the rotatable cam 23 is configured with a holder member 22. The cylindrically formed rotatable cam 23 is fitted in this holder member 22 so as to rotate and slide in the axial direction.

Further, to the second half part of the holder member 22, a cylindrically formed sliding member 24 is attached so as to slide in the axial direction against the holder member 22. The sliding member 24 contains a metal cushion spring 25. One end of the cushion spring 25 abuts an inner front end face of the sliding member 24 to push forward the rotatable cam 23 in the axial direction via the sliding member 24.

In the rear end portion of the holder member 22, a resin formed middle plug 26 is fitted to receive a rear end portion of the cushion spring 25. On the rear end portion of the middle plug 26, a ring-shaped undercut portion 26a is formed by which the middle plug 26 is fitted and fixed in the body cylinder 1.

Further, the central portion of the middle plug 26 has a plurality of circumferential slits to form a bellows-shape. The bellows-shape structure constitutes a spring body 26b configured to push forward the holder member 22 by the action of the spring body 26b.

Thus, a portion of the holder member 22 abuts a step portion 1a formed inside the body cylinder 1 to position the rotational drive mechanism 21 including the holder member 22.

Note that, the inner sides of the rotatable cam 23, the sliding member 24, and the middle plug 26 form a space through which the lead case 4 is disposed so that the lead case 4, the chuck 6, etc. can independently move in the axial direction.

Figure 5:
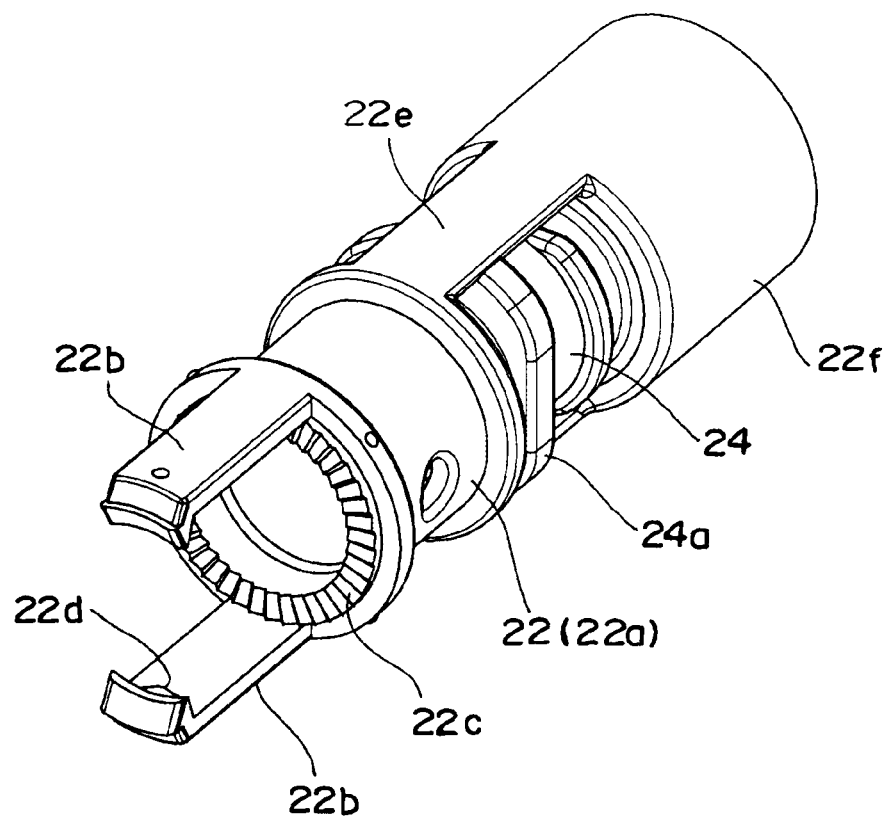
FIG. 5 is a perspective view mainly illustrating a holder member constituting a rotational drive mechanism.
Figure 6:
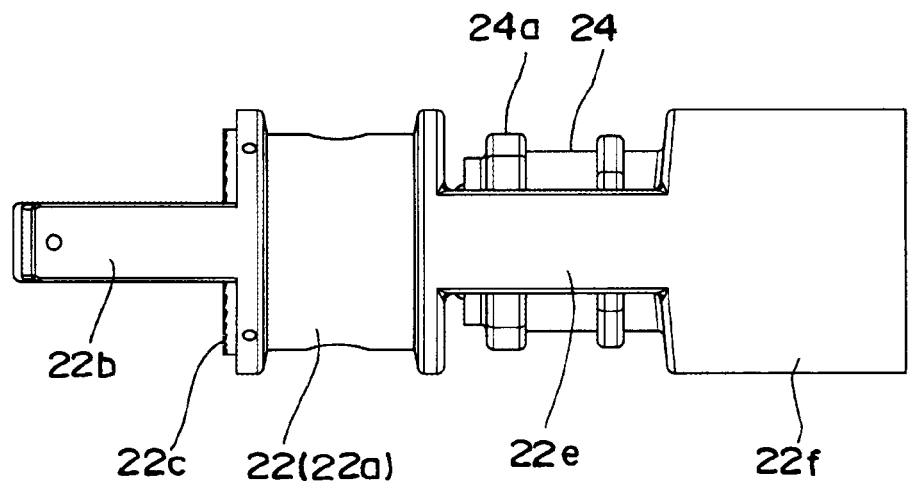
FIG. 6 is a front view of the holder member illustrated in FIG. 5.
Figure 7:
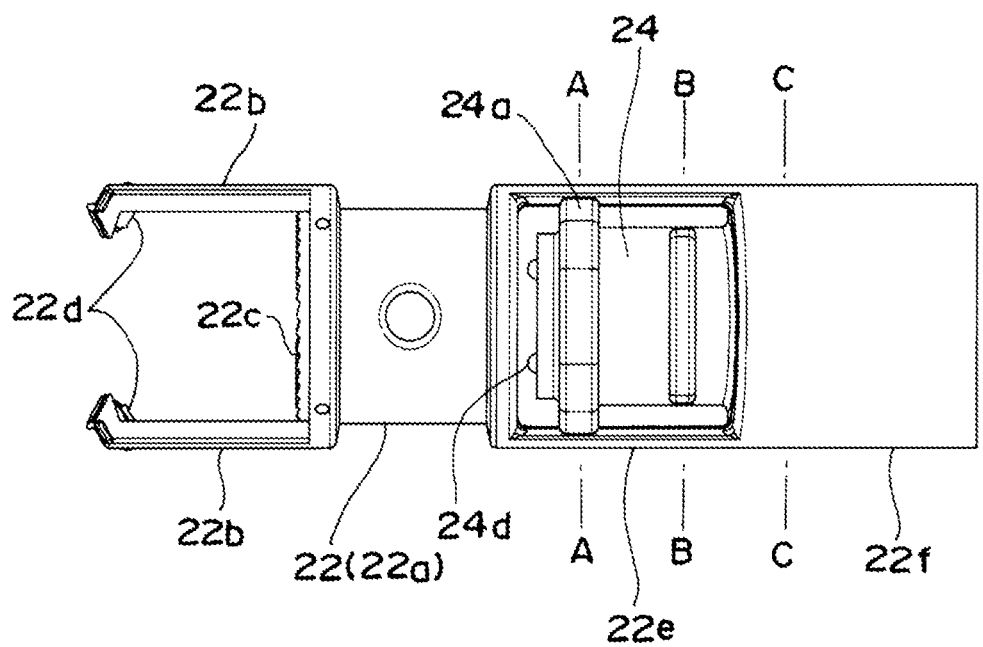
FIG. 7 is a top view of the holder member rotated by 90 degrees from the state illustrated in FIG. 6.
Figure 8:
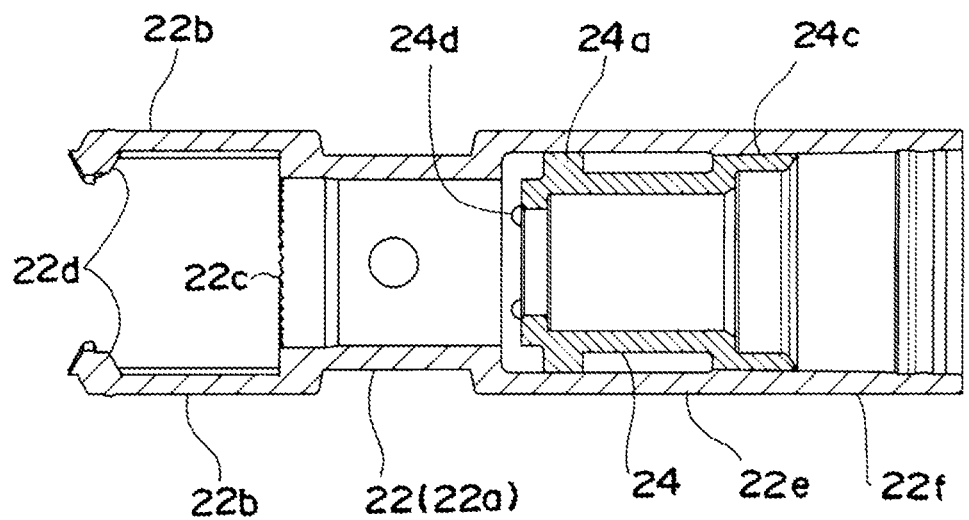
FIG. 8 is a longitudinal sectional view of the central portion in FIG. 7.
Figure 9:
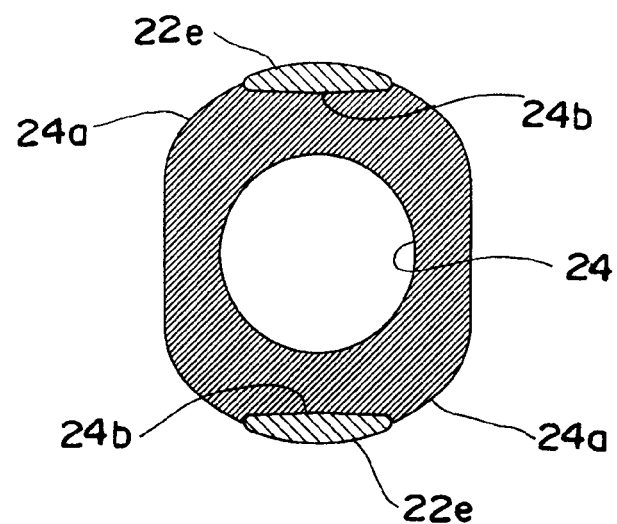
FIG. 9 is a sectional view of main parts taken along the line A-A in FIG. 7.
Figure 10:
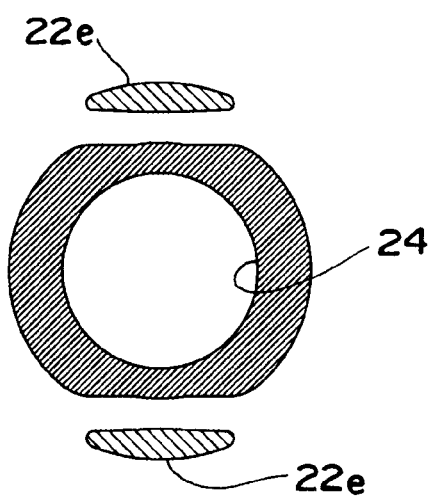
FIG. 10 is a sectional view of main parts taken along the line B-B in FIG. 7.
Figure 11:
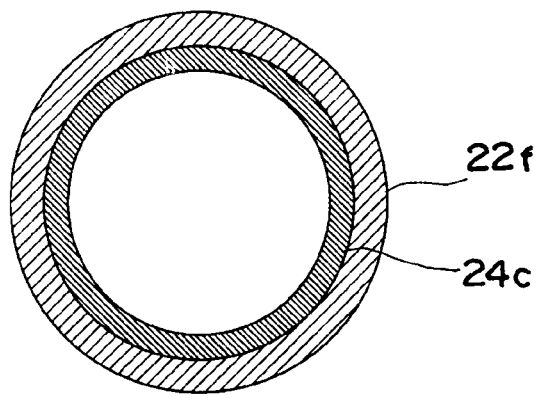
FIG. 11 is a sectional view of main parts taken along the line C-C in FIG. 7.
Figure 12:
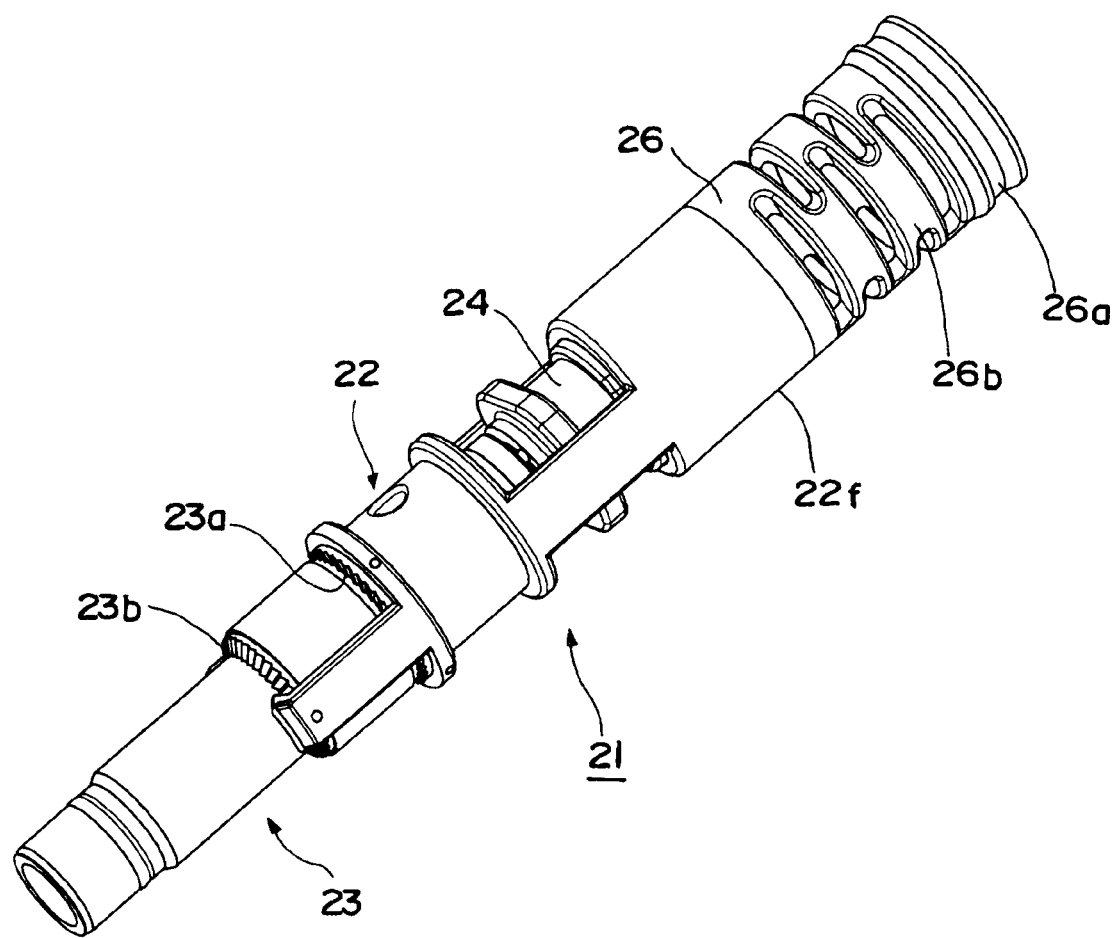
FIG. 12 is a perspective view of a general structure of the rotational drive mechanism.
Figure 13:
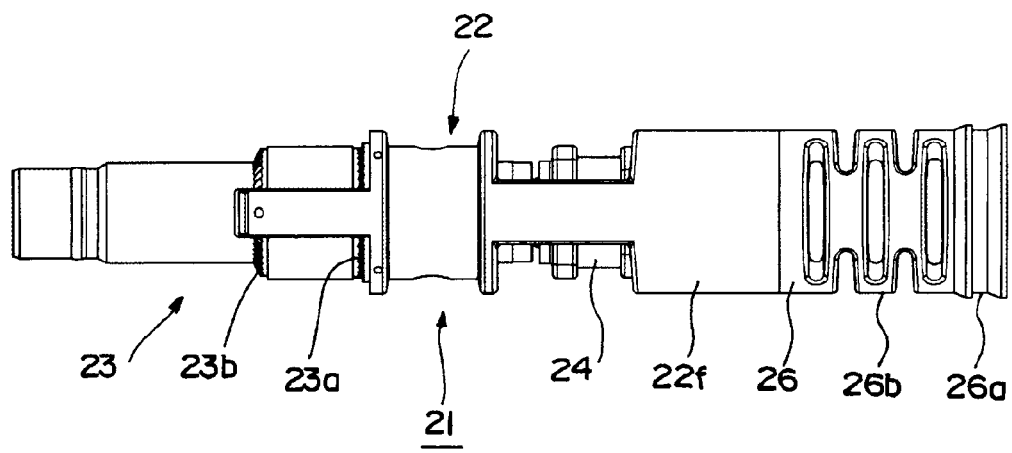
FIG. 13 is a front view of the rotational drive mechanism illustrated in FIG. 12.
Figure 14:
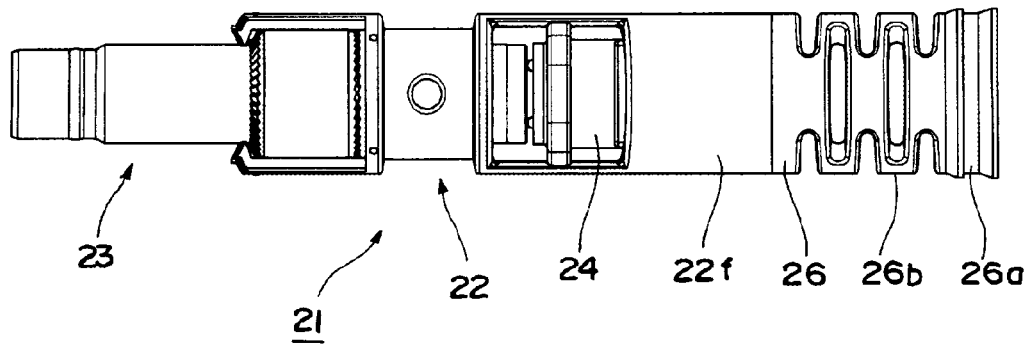
FIG. 14 is a top view of the rotational drive mechanism rotated by 90 degrees from the state illustrated in FIG. 13.

Further, the rotational drive mechanism 21 is provided with the holder member 22, the rotatable cam 23, the sliding member 24, the middle plug 26, etc., which are made into a unit. A structure of this unit of the rotational drive mechanism 21 will be described in detail later with reference to FIG. 5 and other drawings.

Figure 3:
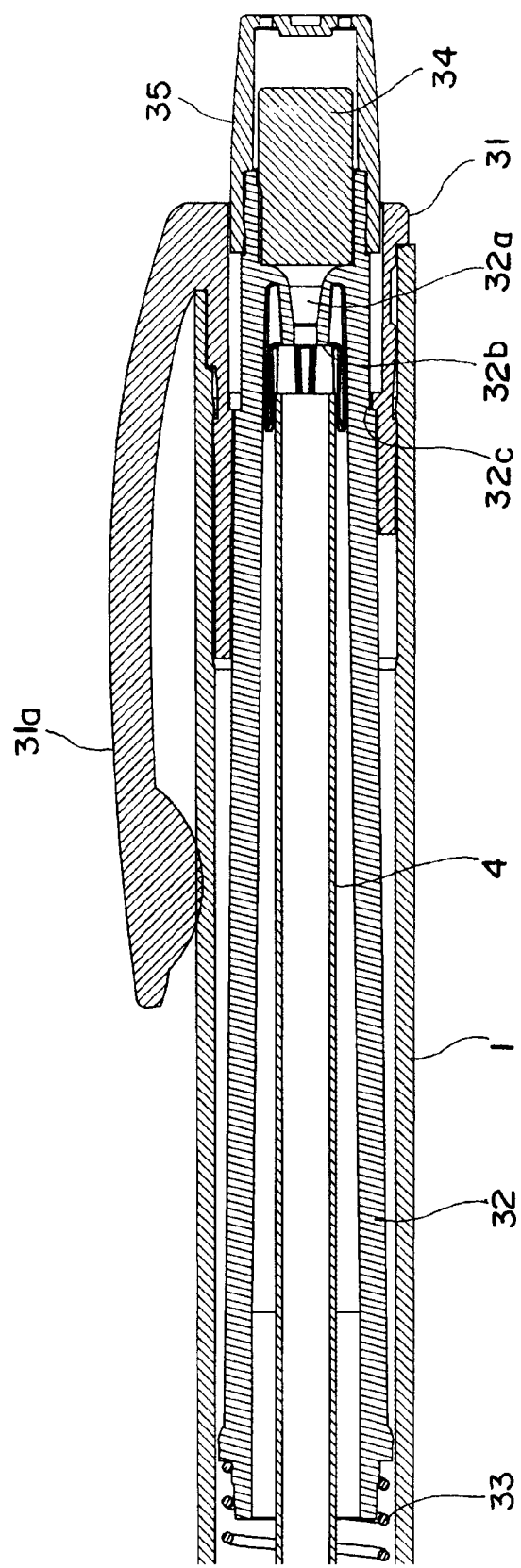
FIG. 3 is a sectional view, continued from FIG. 2, of a second half part of the mechanical pencil.

As illustrated in FIGS. 1 and 3, in the rear end portion of the body cylinder 1, a cylindrical clip support 31 integrally formed with a clip 31a is attached to be fitted in the inner periphery of the body cylinder 1. Further, a cylindrically formed knock bar 32 is accommodated along the clip support 31 and the body cylinder 1. An axial spring 33 is disposed between the front end portion of the knock bar 32 and the rear end portion of the middle plug 26 to project the knock bar 32 toward the rear side of the body cylinder 1.

Note that, the knock bar 32 has a step portion 32c having a large outer diameter which is configured to axially abut a portion on the inner periphery of the clip support 31 so as to prevent the knock bar 32 from coming off and to position the knock bar 32.

An eraser 34 is detachably fitted in the rear end portion of the knock bar 32, and a knock cover 35 which covers the eraser 34 is detachably fitted on the periphery of the rear end portion of the knock bar 32.

At the location on the knock bar 32 where the eraser 34 is fitted, a small feeding hole 32a with a small diameter for a writing lead is formed. Just before the feeding hole 32a, an abutting portion 32b is formed to be perpendicular to the axis of the feeding hole 32a.

In addition, the abutting portion 32b formed on the knock bar 32 and the rear end portion of the lead case 4 are configured to face each other with a predetermined axial gap therebetween.

According to this structure, even if the chuck 6 and the lead case 4 retreat a little by writing, the rear end portion of the lead case 4 does not strike the knock bar 32, so that the rotation of the rotational drive mechanism 21 will not be affected.

In the above structure, as the knock cover 35 is knocked, the axial spring 33 is contracted, and the abutting portion 32b of the knock bar 32 pushes the lead case 4 forward. As a result, the chuck 6 moves forward to push forward the slider 9 a little. However, since a portion of the slider 9 comes into abutment with the base member 3, thus being restricted from moving forward, the tip portion of the chuck 6 projects relatively from the clamp 7, and the writing lead gripped by the chuck 6 is released.

As the knock operation is released, the knock cover 35 retreats to be in the original state by the action of the axial spring 33, and the chuck 6 and the lead case 4 retreat in the body cylinder 1 by the action of the chuck spring 13.

At this time, the writing lead is temporarily held by friction in the through hole formed in the holder chuck 12. In this state, as the chuck 6 retreats, the tip portion of the chuck 6 is accommodated in the clamp 7, whereby the writing lead is gripped again.

That is, as the chuck 6 moves forward and backward by repeating the knock operation of the knock cover 35, the writing lead is gripped and released, and thus the writing lead is gradually inched forward from the chuck 6.

FIGS. 5 to 11 illustrate the holder member 22 constituting the outside of the rotational drive mechanism 21 for a writing lead. In the central portion of the holder member 22, a cylindrical portion 22a is formed. The inner periphery of the cylindrical portion 22a supports the rotatable cam 23 while allowing rotation and movement in the axial direction.

A pair of axially long elastic members 22b is formed at positions which are symmetrical about the axis (positions opposing each other by 180 degrees) on one of end portions of the cylindrical portion 22a, that is, at the front end side in a state where the rotational drive mechanism 21 is mounted in the body cylinder 1. By way of resin mold, the pair of elastic members 22b is formed integrally with the central cylindrical portion 22a and formed to be long and slender to have elasticity.

Further, a large number of cams (hereinafter referred to as first fixed cam) 22c each having a saw tooth shape are continuously formed along a ring shape near the base end portions of the pair of elastic members 22b in the cylindrical portion 22a side, that is, on an end face of the cylindrical portion 22a.

Furthermore, cams (hereinafter, referred to as second fixed cam) 22d each having a saw tooth shape are formed at the tip portion of each of the pair of the elastic members 22b.

The second fixed cam 22d is formed on a tilt face on the tip portion along the longitudinal direction of the elastic member 22b, where the tilt face bends toward the axis by a certain obtuse angle.

At the other end side of the central cylindrical portion 22a, that is, at the rear end side where the rotational drive mechanism 21 is mounted in the body cylinder 1, a pair of columnar pieces 22e extending in the axial direction is formed while being symmetrical about the axis. A second cylindrical portion 22f is integrally formed with the cylindrical portion 22a via the columnar pieces 22e.

In addition, the cylindrically formed sliding member 24 is fitted in the region surrounded by the pair of columnar pieces 22e and the second cylindrical portion 22f of the holder member 22. On the front end portion of the sliding member 24, a flange 24a is formed to project perpendicular to the axial direction. At a location on the flange 24a facing one of the pair of columnar pieces 22e, a recessed guide portion 24b is formed as illustrated in the sectional view of FIG. 9.

Further, the rear end portion of the sliding member 24 is cylindrically formed to constitute a slide contact portion 24c. That is, the slide contact portion 24c slides against the inner periphery of the second cylindrical portion 22f of the holder member 22 illustrated in FIG. 11.

In this embodiment, each of the pair of columnar pieces 22e is configured straight to have the same width in the circumferential direction along the axial direction, and the pair of columnar pieces 22e is configured that the distance between inner sides of the pair of opposing columnar pieces 22e is the same along the axial direction.

Thus, by the recessed guide portion 24b formed on the flange 24a sliding along the pair of columnar pieces 22e, the sliding member 24 reciprocates inside the holder member 22 along the axial direction without rotating.

Further, on the annular front end face of the sliding member 24, semi-spherical small projections 24d are formed while being approximately evenly spaced between each other in the circumferential direction. These small projections 24d abut the rear end portion of the rotatable cam 23 to push the rotatable cam 23 forward and to slide itself against the rear end face of the rotatable cam 23.

Note that, the inner face of the columnar piece 22e of the holder member 22 is formed, by way of two-color molding, using the sliding member 24 as a primary molding.

In the two-color molding performed in this embodiment, the sliding member 24, or the primary molding, is formed of POM, and the holder member 22 including the columnar piece 22e, which is formed by way of two-color molding using the outer surface of a portion of the sliding member 24, is secondarily molded also using POM, that is, the same resin material as that used for primary molding.

As described above, by using the outer shape of the guide portion 24b of the sliding member 24 to perform two-color molding of the columnar piece 22e of the holder member 22, the columnar piece 22e of the holder member 22 is formed to have a shape transferred from the guide portion 24b formed on the sliding member 24. In this manner, the two moldings can be formed with as small a clearance therebetween as possible.

Further, by using the same material, that is, POM for the primary molding and the secondary molding, the two moldings can be separated without sticking to each other after the two-color molding. Moreover, POM has an advantageous profile that lubrication (slidability) between POM and POM is good, so that the movement of the sliding member 24 in the axial direction against the holder member 22 can smoothly be made without resistance.

Note that, an example of performing two-color molding where the sliding member 24 is molded as a primary molding and the holder member 22 is molded as a secondary molding will be described later with reference to FIGS. 23A to 23D.

FIGS. 12 to 15 illustrate a unit of the rotational drive mechanism 21 configured by attaching the rotatable cam 23 in front of the holder member 22 along the axial direction and attaching the cushion spring 25 and the middle plug 26 on the rear end side of the holder member 22.

The rotatable cam 23 is cylindrically formed having a large diameter portion in a central portion. On an upper face and a lower face, which are perpendicular to the axis, of the large diameter portion, a large number of saw tooth cams 23a and 23b are respectively formed continuously along a ring shape. Note that, the cam 23a meshing with the first fixed cam 22c of the holder member 22 is hereinafter referred to as upper cam, and the cam 23b meshing with the second fixed cam 22d is hereinafter referred to as lower cam.

Further, as a rotation shaft 23c of the rotatable cam 23 is pushed in from the side of the pair of elastic members 22b formed on the holder member 22, the pair of elastic members 22b is extended outward, and the rotation shaft 23c is accommodated in the cylindrical portion 22a. As a result, the rotatable cam 23 is fitted in the holder member 22 so as to rotate and move in the axial direction.

Note that, in this embodiment, the lower cam 23b is formed on a tilt face having a conical shape. Therefore, as described above, the second fixed cam 22d meshing with the lower cam 23b is formed on the tilt face on the tip portion along the longitudinal direction of the elastic member 22b, where the tilt face bends toward the axis by a certain obtuse angle. Thus, in this embodiment, the cushion spring 25 biases the rotatable cam 23 forward in the axial direction to provide an ideal meshing state where the axis of the rotatable cam 23 coincides with the axis of the holder member 22.

Meanwhile, the middle plug 26 is fitted in the second cylindrical portion 22f of the holder member 22 from the rear end portion with the cushion spring 25 fitted in the sliding member 24, thereby constituting the rotational drive mechanism 21.

Figure 15:
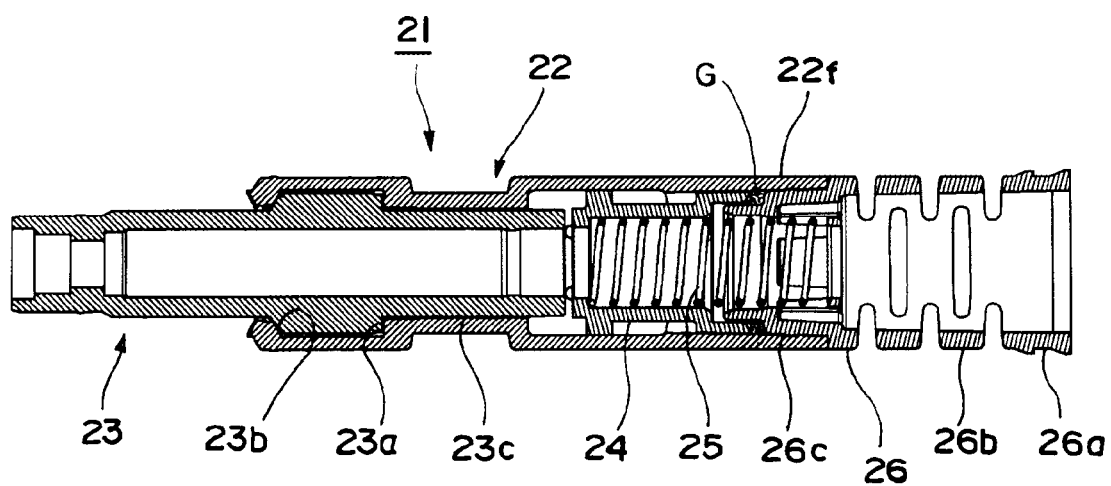
FIG. 15 is a longitudinal sectional view of the central portion in FIG. 14.

That is, as illustrated in the sectional view in FIG. 15, an engagement portion 26c having a small outer diameter in the front end portion is formed in the middle plug 26.

Thus, by fitting the cushion spring 25 in the sliding member 24 and then pushing the engagement portion 26c in the second cylindrical portion 22f of the holder member 22 from the rear end side, the rotational drive mechanism 21 illustrated in FIGS. 12 to 15 can be configured.

Then, the rotational drive mechanism 21 is inserted into the body cylinder 1 from the rear end side, and by fitting the undercut portion 26a of the middle plug 26 in a predetermined location in the body cylinder 1, as already described with reference to FIGS. 1, 2, 4, and in other drawings, the rotational drive mechanism 21 is fitted in the body cylinder 1.

The rotational drive mechanism 21 of a writing lead is thus configured to allow the rotatable cam 23 to rotate with the chuck 6 about the axis with the chuck 6 gripping the writing lead as illustrated in FIGS. 2 and 4. Further, in a case where the mechanical pencil is not in a writing state, the rotatable cam 23 is biased forward through the sliding member 24 by the action of the cushion spring 25 arranged in the rotational drive mechanism 21.

When the writing pressure is applied to the writing lead projecting from the pipe end 10 by the writing operation, the chuck 6 retreats against the bias force of the cushion spring 25. In conjunction with this, the rotatable cam 23 also retreats slightly in the axial direction. Therefore, the upper cam 23a having a shape of a saw tooth formed on the rotatable cam 23 meshes with the first fixed cam 22c to be in a meshed state.

In this case, the upper cam 23a and the first fixed cam 22c which face each other are arranged to have a half-phase (half-pitch) shifted relationship with respect to one tooth of the cam in the circumferential direction. As described above, since the upper cam 23a meshes with the first fixed cam 22c to be in a meshed state, the rotatable cam 23 is rotationally driven by a half phase (half pitch) of one tooth of the upper cam 23a.

Further, in a state where the upper cam 23a meshes with the first fixed cam 22c to be in a meshed state as described above, the lower cam 23b having the shape of a saw tooth and the second fixed cam 22d which face each other are arranged to have a half-phase (half-pitch) shifted relationship with respect to one tooth of the cam in the circumferential direction.

Therefore, when the writing of one stroke finishes and the writing pressure to the writing lead is released, the rotatable cam 23 slightly moves forward in the axial direction by being pushed by the action of the cushion spring 25, and the lower cam 23b formed on the rotatable cam 23 meshes with the second fixed cam 22d. As a result, the rotatable cam 23 is subjected again to the rotational drive corresponding to the half-phase (half-pitch) of one tooth of the lower cam 23b in the same direction.

According to the mechanical pencil as described above, in conjunction with the reciprocating motion (cushion operation) of the rotatable cam 23 in the axial direction caused by the writing pressure, the rotatable cam 23 is subjected to rotational drive corresponding to one tooth (one pitch) of the upper cam 23a and the lower cam 23b, and the writing lead gripped by the chuck 6 is similarly rotationally driven in one direction via the chuck 6.

Therefore, the tip portion of the writing lead is always kept to be in a conical shape due to the rotational motion applied to the writing lead and wearing by writing. Thus, it is possible to prevent the writing lead from being locally abraded as the writing proceeds and to write with an almost constant line width.

Figure 16:
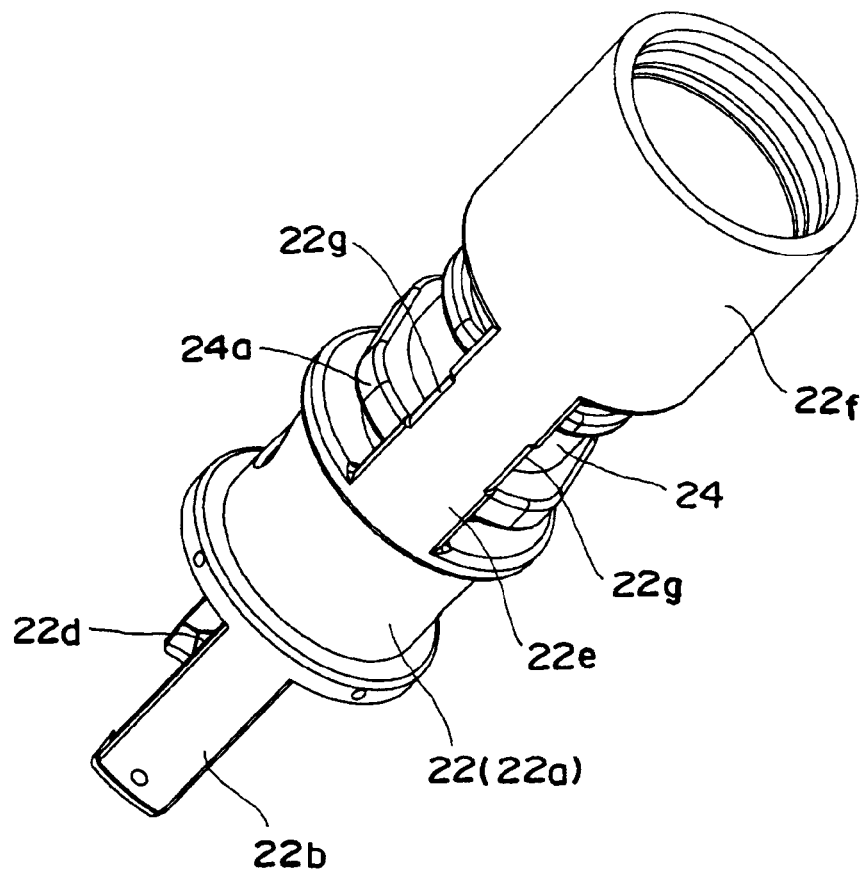
FIG. 16 is a perspective view of a second embodiment of the holder member.
Figure 17:
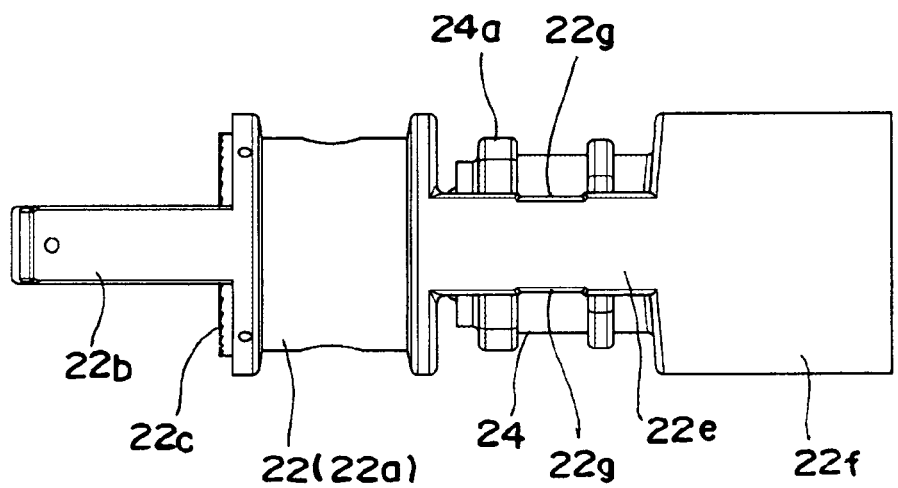
FIG. 17 is a front view of the holder member illustrated in FIG. 16.

FIGS. 16 to 19 illustrate a second embodiment of the rotational drive mechanism 21. FIGS. 16 and 17 illustrate the structure of the holder member 22.

In the second embodiment, on both sides in the width direction at a portion of each of the pair of columnar pieces 22e formed in the holder member 22, step portions 22g are formed to reduce the width in the circumferential direction of the columnar piece 22e.

That is, in this embodiment, the step portion 22g is formed in the longitudinally central portion of the columnar piece 22e to extend approximately one third of the longitudinal length of the columnar piece 22e.

As already described, when the two-color molding of the sliding member 24 is performed on the holder member 22, the relationship between the holder member 22 and the sliding member 24 is as illustrated in FIGS. 16 and 17. That is, the two-color molding of the flange 24a of the sliding member 24 is performed at the location on the columnar piece 22e of the holder member 22 close to the cylindrical portion 22a.

Further, when the rotatable cam 23 is fitted in the holder member 22, the flange 24a of the sliding member 24 is set at a location where the step portion 22g reducing the width of the columnar piece 22e is formed.

Figure 18:
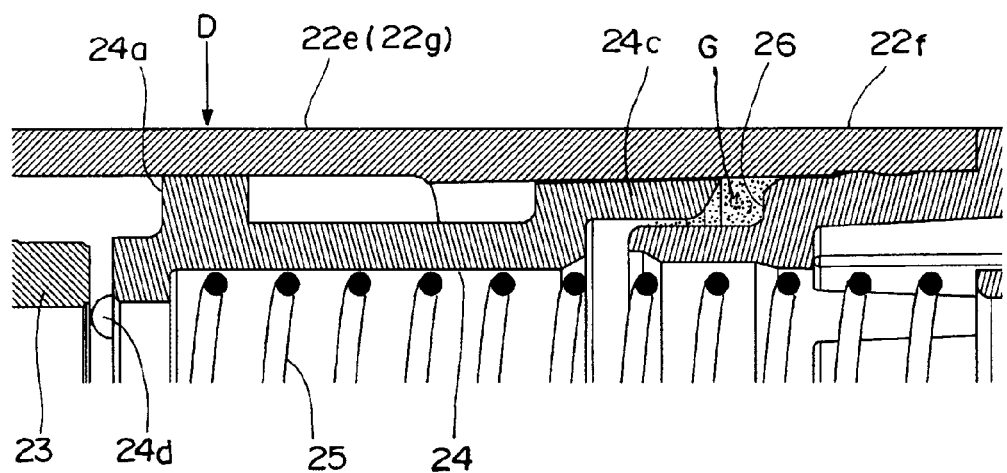
FIG. 18 is a sectional view of a main portion where the holder member illustrated in FIG. 16 is attached to the rotational drive mechanism.
Figure 19:
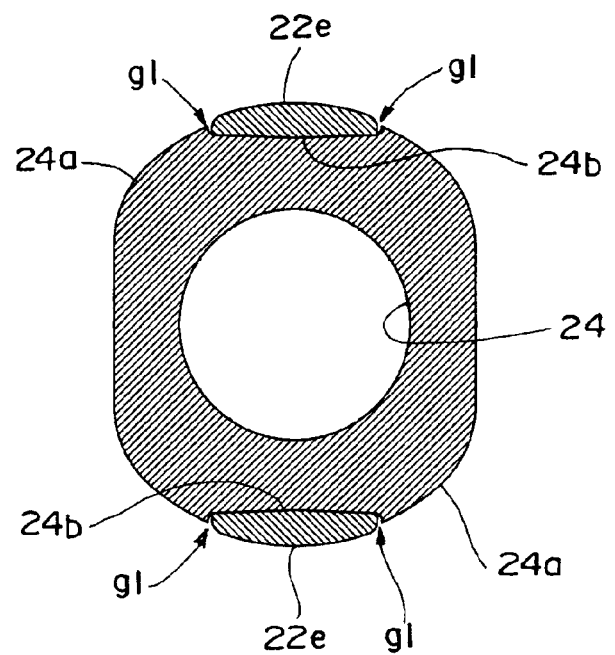
FIG. 19 is a sectional view of main parts of the section shown by the arrow D in FIG. 18.

FIGS. 18 and 19 are sectional views of a main portion of the structure of the rotational drive mechanism 21 configured using the holder member 22 illustrated in FIGS. 16 and 17.

In this embodiment, as well illustrated in FIG. 19, the clearance between the inner face of the columnar piece 22e and the guide portion 24b of the sliding member 24 can be set as small as possible, but a slight amount of clearance (gap g1) is produced on both sides, in the width direction of the columnar piece 22e, of the recess of the guide portion 24c.

The gaps g1 on both sides are caused by forming the step portion 22g. When the holder member 22 is formed (primary molding), by way of resin mold, the clearances on both sides of the guide portion 24c can be adjusted by considering the width of the step portion 22g when determining the shape of the die.

Figure 20:
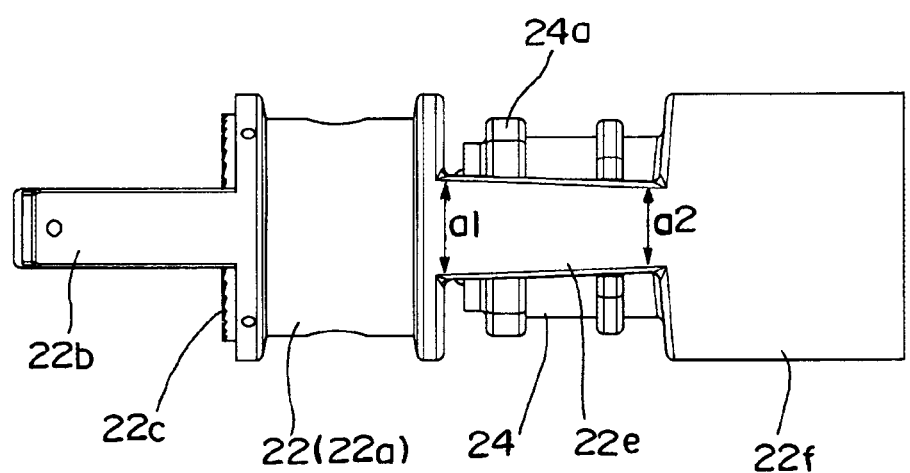
FIG. 20 is a front view of a third embodiment of the holder member.

FIG. 20 illustrates a third embodiment of the rotational drive mechanism 21. In this example, each of the pair of columnar pieces 22e formed in the holder member 22 has a tapered shape in which the width in the circumferential direction slightly decreases rearward along the axial direction.

That is, each of the pair of columnar pieces 22e is formed to have a relationship of a1>a2, where a1 represents the width of the columnar piece 22e on the side of the cylindrical portion 22a and a2 represents the width of the columnar piece 22e on the side of the second cylindrical portion 22f.

In this configuration, when writing pressure is applied to retreat the rotatable cam 23 and the sliding member 24, the clearance between the outer side of the guide portion 24c of the sliding member 24 and the columnar piece 22e, that is, the gap g1 illustrated in FIG. 19, increases. Thus, by adjusting the widths a1 and a2 of the columnar piece 22e when forming the holder member 22, the clearance can suitably be adjusted.

Figure 21:
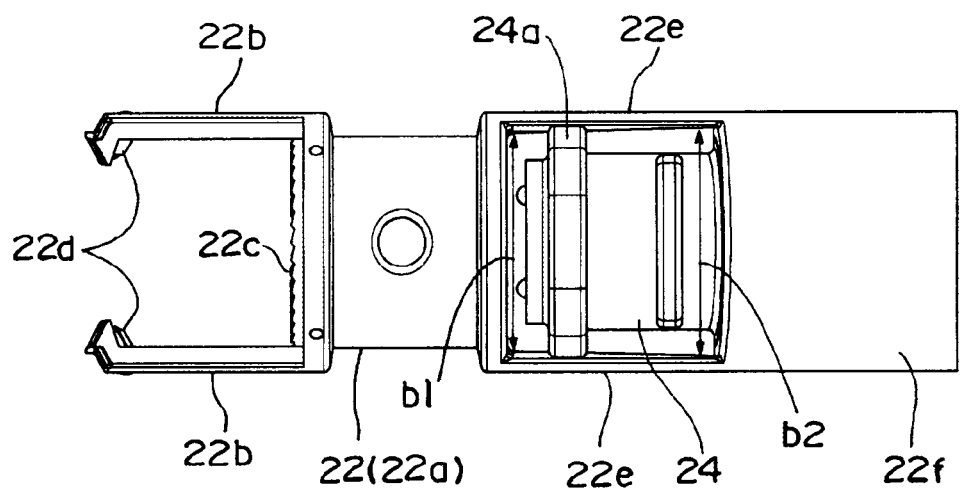
FIG. 21 is a top view of a fourth embodiment of the holder member.
Figure 22:
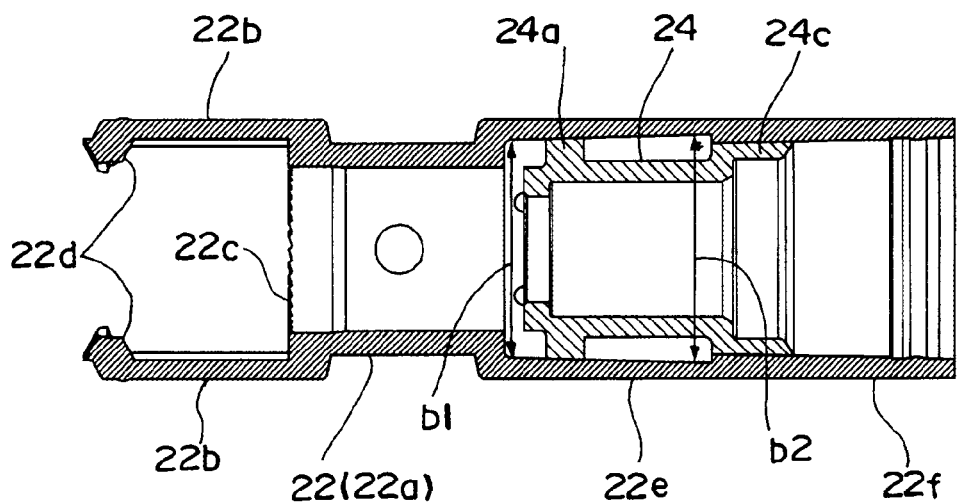
FIG. 22 is a central sectional view of the holder member illustrated in FIG. 21.

FIGS. 21 and 22 illustrate a fourth embodiment of the rotational drive mechanism 21. In this example, each of the pair of columnar pieces 22e formed in the holder member 22 is formed in a tapered shape in which the inner distance between the opposing columnar pieces 22e slightly increases rearward along the axial direction.

That is, each of the pair of columnar pieces 22e is formed to have a relationship of b1<b2, where b1 represents the distance between the opposing columnar pieces 22e on the side of the cylindrical portion 22a and b2 represents the distance between the opposing columnar pieces 22e on the side of the second cylindrical portion 22f.

In this configuration, when writing pressure is applied to retreat the rotatable cam 23 and the sliding member 24, the clearance between the guide portion 24c of the sliding member 24 and the columnar piece 22e increases. Thus, by adjusting the distances between the opposing columnar pieces 22e, that is, b1 and b2 when forming the holder member 22, the clearance can suitably be adjusted.

It is evident that when using a mechanical pencil including the rotational drive mechanism 21 of a writing lead as described above, the cushion operation of the lead generated by writing causes a unique unpleasant feeling. Particularly, when the metal cushion spring 25 is used to move forward the rotatable cam 23 by releasing writing pressure, the retreat motion of the writing lead is felt like the writing lead sinking and the return motion of the cushion spring 25 is felt like rattling.

These may be caused by an abrupt retreat motion which is initiated when a predetermined load (writing pressure) is applied to the writing lead. In addition, the cushion spring 25 produces fast retreat motion when the writing pressure is released, which causes the pen point (writing lead) to still stay on a paper even when the pen is lifted. Therefore, when writing a hook, a fade, etc., the writing may not stop at where the writer has lifted the pen. These effects may by combined to cause the unique unpleasant feeling.

To solve such an issue, it is preferable to provide a portion of the rotational drive mechanism 21 with a damper function to damp the cushion operation. In a preferable example to achieve such a function, a sticky medium such as a sticky grease G is sealed in the space between the middle plug 26 and the sliding member 24 in the holder member 22, as illustrated in FIGS. 15 and 18.

In this configuration, the sticky grease G stays between the inner face of the holder member 22 and the outer periphery of the sliding member 24 (the slide contact portion 24c illustrated in FIG. 18) to provide the damper function to the movement of the sliding member 24 in the axial direction.

The sticky grease G may preferably have consistency in a range of 100 to 400 to provide the damper function. For example, "Shin-Etsu silicone grease" (trade name; manufactured by Shin-Etsu Chemical Co., Ltd.; product numbers: G330 to G334, G340 to G342, G351 to G353, and G631 to G633) can suitably be used.

By using the sticky grease G to provide the damper function, an abrupt axial movement of the writing lead produces high viscous resistance, but for a static load of a relatively slow movement, the viscous resistance is small. Hence, the impact upon contact between the pen point and the paper can effectively be damped according to writing pressure and writing speed.

FIGS. 23A to 23D exemplarily illustrate the forming, by way of resin mold, of the holder member 22 and the sliding member 24 constituting the rotational drive mechanism 21. That is, FIGS. 23A to 23D exemplarily illustrate the two-color molding where the sliding member 24 is a primary molding and the holder member 22 is a secondary molding.

Figure 23A:
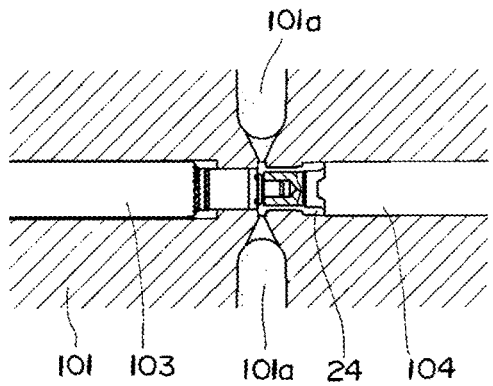
FIGS. 23A to 23D are process drawings exemplarily illustrating the two-color molding of the holder member performed on the sliding member.

FIG. 23A illustrates the sliding member 24 being formed as the primary molding in a cavity formed by a first die 101, a first core pin 103, and a second core pin 104.

Note that, the first die 101 is configured to open and close in the front-and-rear direction in the figure, and a resin injecting runner 101a is formed in the first die 101.

Figure 23B:
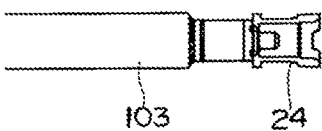

FIG. 23B illustrates the sliding member 24, or the primary molding, separated from the first die 101. The sliding member 24 is attached to the first core pin 103 when separated from the first die 101.

Figure 23C:
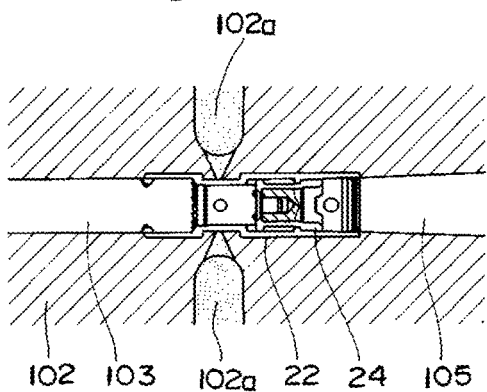

The sliding member 24 formed as the primary molding is accommodated in a second die 102 illustrated in FIG. 23C, and the holder member 22 is formed as the secondary molding in a cavity formed by the first core pin 103 and a third core pin 105.

Note that, the second die 102 is also configured to open and close in the front-and-rear direction in the figure, and a resin injecting runner 102a is formed in the second die 102.

When the holder member 22, or the secondary molding, is formed, the outer shape of the guide portion 24b of the primarily formed sliding member 24 is used to form the columnar piece 22e of the holder member 22. Thus, the columnar piece 22e of the holder member 22 is formed to have a shape transferred from the guide portion 24b formed on the sliding member 24. In this manner, the two moldings can be formed with as small a clearance therebetween as possible.

Figure 23D:
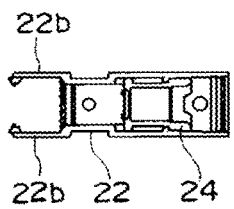

FIG. 23D illustrates the sliding member 24 as the primary molding and the holder member 22 as the secondary molding, which are separated from the second die 102.

From this state, a push rod serving as a jig (not shown) is inserted into the holder member 22 through the space between the pair of elastic members 22b formed on the holder member 22 along the axial direction to axially push the sliding member 24, or the primary molding. As a result, the sliding member 24 is separated from the holder member 22. In this manner, as already described with reference to FIGS. 5 to 8, the holder member 22 accommodating the sliding member 24 can be obtained.

Further, in this embodiment, as already described above, two-color molding is performed to form the sliding member 24 as the primary molding and the holder member 22 as the secondary molding both using POM.

FIGS. 24 to 26D illustrate an embodiment applying the present invention to a fluid applicator.

The embodiment illustrated in FIGS. 24 to 26D is a fluid applicator for applying fluid such as ink and cosmetic materials (e.g., manicure). More specifically, the embodiment relates to the fluid applicator configured not to supply fluid to a writing tip before use, for example, when being stocked or sold, and to introduce the fluid to the writing tip when the purchaser uses the applicator.

Figure 24:
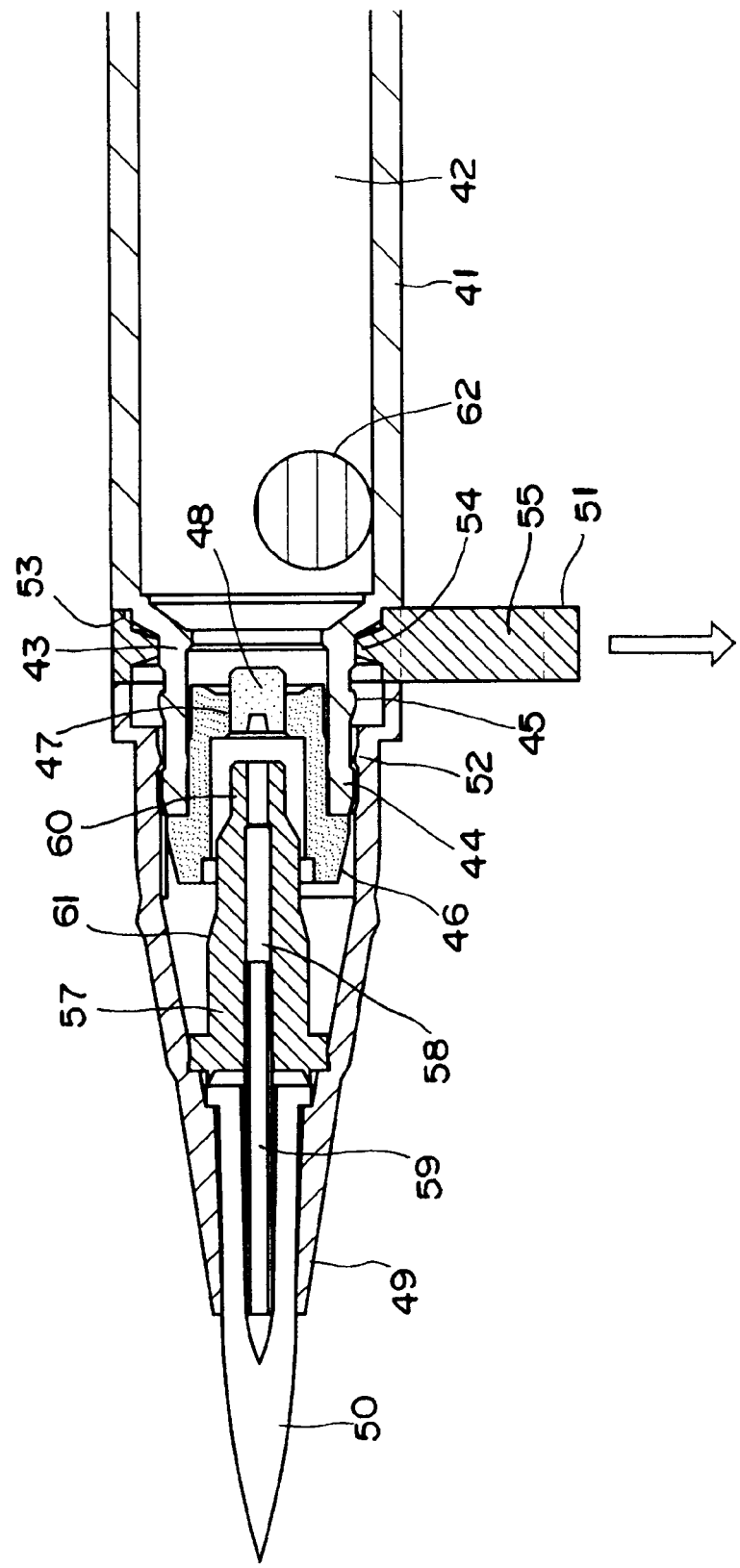
FIG. 24 is a sectional view of an example in which the present invention is applied to a fluid applicator, where fluid is not supplied to a writing tip.
Figure 25:
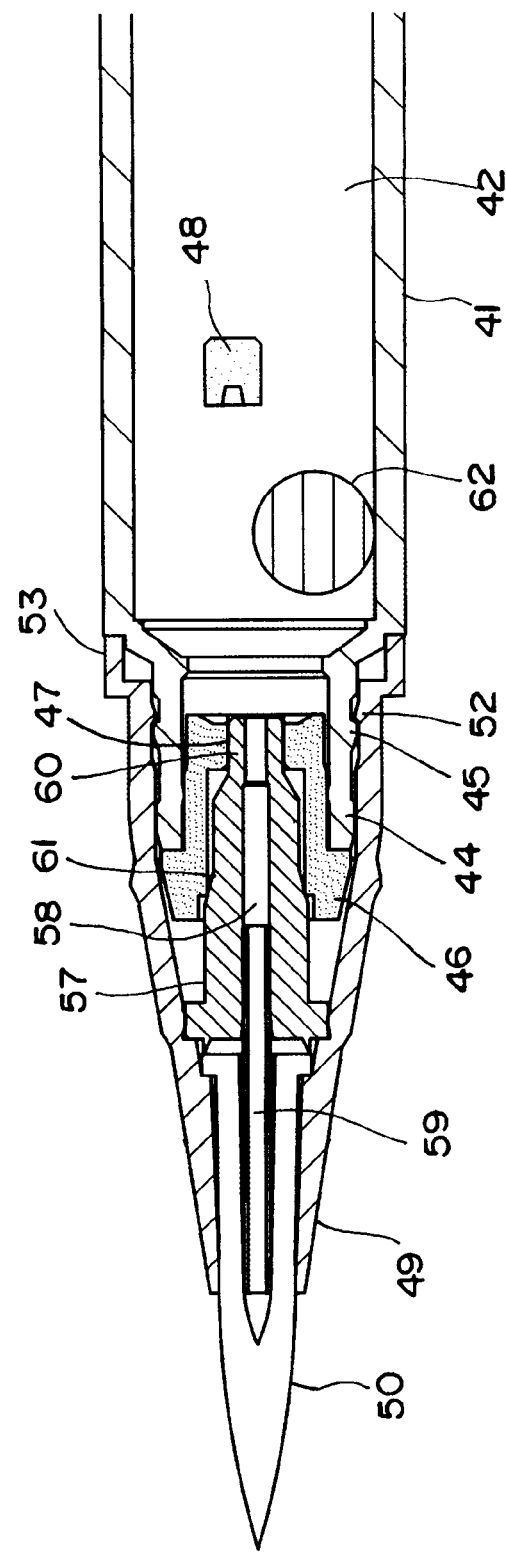
FIG. 25 is a sectional view illustrating a state in which the fluid is supplied to the writing tip.

A shaft main body 41 illustrated in FIGS. 24 and 25 is made of resin and has a storage tank 42 for fluid inside and a thin connection cylinder 43 at the front end. On the outer face of the connection cylinder 43, a first engagement portion 44 and a second engagement portion 45, each projecting by undercut, are respectively provided at two different axial locations.

A mouth portion 46 is fitted in the inner face of the front end opening of the shaft main body 41. A through hole is provided in the mouth portion 46 as a fluid discharge port 47 to which a columnar plug body 48 is watertightly fitted before use (see FIG. 24).

The front body 49 is made of resin and tapered toward the tip. The front body 49 holds a tapered writing tip 50 formed of a bundle of a large number of fibers so as to project the tip of the writing tip 50 from the distal end opening of the front body 49. The rear end portion of the front body 49 is configured to fit on the outer periphery of the thin connection cylinder 43 provided on the tip portion of the shaft main body 41. Further, on the inner face of the rear end portion of the front body 49, a projecting engagement portion 52 is provided. The engagement portion 52 engages with the first engagement portion 44 to maintain a temporary coupled state. When a stopper 51, which will be described below, is removed and the front body 49 is axially pushed against the shaft main body 41, the engagement portion 52 elastically deforms to go over the second engagement portion 45, thereby engaging with the second engagement portion 45 to be in a fully coupled state.

Note that, the front body 49 is configured to have dimensions such that when temporarily coupled to the shaft main body 41, the gap between the rear edge of the front body 49 and an outer face step portion 53 of the shaft main body 41 is approximately the same as the width of a ring portion 54 of the stopper 51 which will be described below, and that when fully coupled to the shaft main body 41, the rear edge of the front body 49 abuts the outer face step portion 53 of the shaft main body 41.

The stopper 51 is made of resin and includes the elastically deformable C-shaped ring portion 54 and a gripping piece 55. The ring portion 54 is configured to fit on the outer periphery of the root portion of the connection cylinder 43 of the shaft main body 41. The gripping piece 55 is integrally formed with and projects from the ring portion 54. The shaft main body 41 and the front body 49 are temporarily kept coupled with the ring portion 54 positioned therebetween. Before use, the gripping piece 55 is pulled in the direction shown by the arrow in FIG. 24 to elastically deform the ring portion 54 to remove the stopper 51, whereby the shaft main body 41 and the front body 49 are able to be fully coupled.

A fluid communication tube 57 arranged inside the front body 49 is fixed at the rear of the writing tip 50. Into the front end portion of a communication hole 58 provided in the communication tube 57, a rear end portion of a thin pipe 59, which is inserted into the writing tip 50, is inserted.

The communication tube 57 has, in the rear end, a thin push-in cylinder 60 which can be inserted into the discharge port 47 of the mouth portion 46 and a tapered seal face 61 on the outer face in front of the push-in cylinder 60. The communication tube 57 is configured to have dimensions such that when the shaft main body 41 and the front body 49 are temporarily coupled, the tip of the push-in cylinder 60 will not reach the plug body 48, and when the shaft main body 41 and the front body 49 are fully coupled, the push-in cylinder 60 penetrates the discharge port 47 to push out the plug body 48 and the seal face 61 watertightly makes contact with the edge of the opening of the mouth portion 46 (see FIG. 25).

Note that, the columnar plug body 48 pushed out from the discharge port 47 enters the storage tank 42 of the shaft main body 41. Further, the storage tank 42 of the shaft main body 41 contains a fluid mixing ball 62.

Although not shown in the drawing, a bottomed cap for covering the front body 49 and the writing tip 50 is prepared. The opening of the cap is configured to fit onto the root portion of the front body 49 so that the cap and the shaft main body 41 are coaxially fitted with each other.

FIGS. 26A to 26D exemplarily illustrate the two-color molding of the plug body 48 and the mouth portion 46. That is, in FIGS. 26A to 26D, two-color molding is performed where the plug body 48 is a primary molding and the mouth portion 46 is a secondary molding.

Figure 26A:
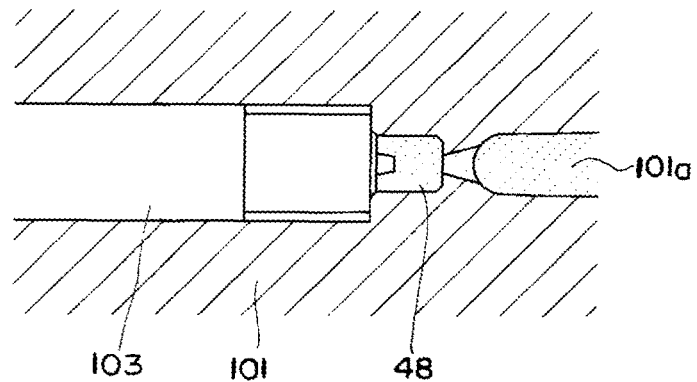
FIGS. 26A to 26D are process drawings exemplarily illustrating the two-color molding of a mouth portion performed on a plug body employed in the applicator illustrated in FIG. 24.

FIG. 26A illustrates the plug body 48 being formed as the primary molding in a cavity formed by a first die 101 and a first core pin 103.

Note that, the first die 101 is configured to open and close in the front-and-rear direction in the figure, and a resin injecting runner 101a is formed in the first die 101.

Figure 26B:
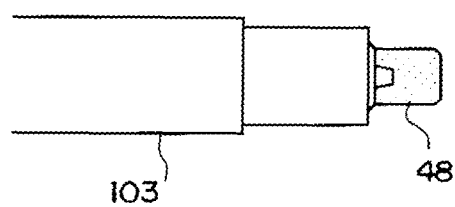

FIG. 26B illustrates the plug body 48, or the primary molding, separated from the first die 101. The plug body 48 is attached to the first core pin 103 when separated from the first die 101.

Figure 26C:
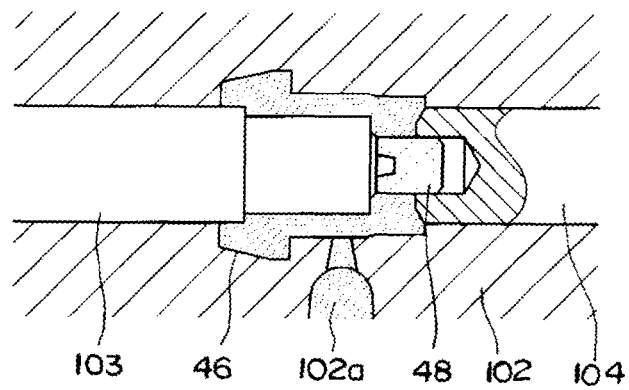

The plug body 48 formed as the primary molding is accommodated in a second die 102 illustrated in FIG. 26C, and the mouth portion 46 is formed as the secondary molding in a cavity formed by the first core pin 103 and a second core pin 104.

Note that, the second die 102 is also configured to open and close in the front-and-rear direction in the figure, and a resin injecting runner 102a is formed in the second die 102.

When the mouth portion 46, or the secondary molding, is formed, the columnar outer periphery of the primarily molded plug body 48 is used to form a portion of the mouth portion 46. In this manner, the mouth portion 46 is formed to be in close contact with the plug body 48.

Figure 26D:
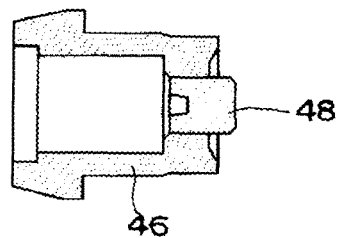

FIG. 26D illustrates the plug body 48 as the primary molding and the mouth portion 46 as the secondary molding, which are separated from the second die 102.

The mouth portion 46 with the plug body 48 hermetically fitted in the center is attached to the shaft main body 41 as illustrated in FIG. 24 so as to seal the discharge port with the plug body 48 to keep the fluid in the shaft main body 41.

As described with reference to FIGS. 24 and 25, by removing the stopper 51 and pushing in the front body 49, the push-in cylinder 60 of the communication tube 57 abuts the plug body 48 and the plug body 48 comes off from the mouth portion 46 to enter the storage tank 42, thereby opening the discharge port 47 to the mouth portion 46.

Further, also in this embodiment, two-color molding is performed to form the plug body 48 as a primary molding and the mouth portion 46 as a secondary molding both preferably using POM.

FIGS. 27 to 31D illustrate an example applying the present invention to a knock-type ballpoint pen.

Figure 27:
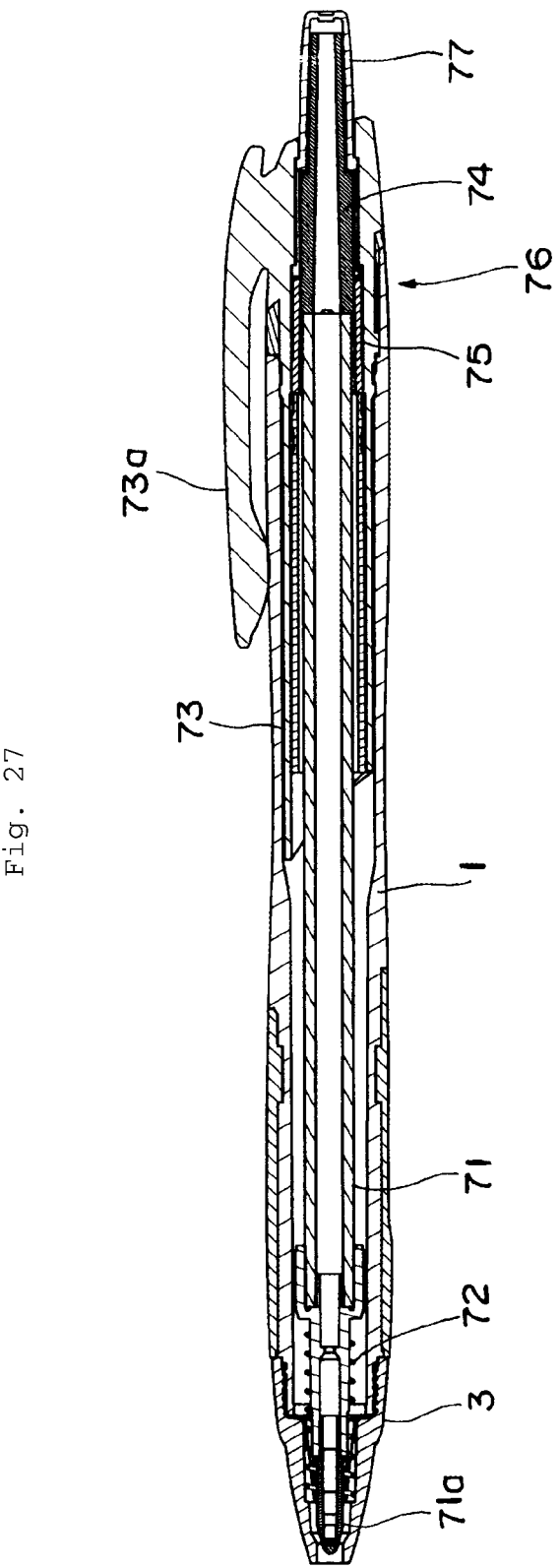
FIG. 27 is a sectional view of a general structure illustrating an example in which the present invention is applied to a knock-type ballpoint pen.

FIG. 27 illustrates a cross section of a general structure where a base member 3 is threadedly coupled with a front end portion of a body cylinder 1 so as to be detachable from the body cylinder 1.

The body cylinder 1 accommodates therein a ballpoint pen refill 71. A ballpoint pen tip 71a attached to the tip portion of the ballpoint pen refill 71 is configured to project from the base member 3 by knocking the knock cover which will be described below.

Further, between the ballpoint pen refill 71 and the base member 3, a return coil spring 72 is disposed which biases the ballpoint pen refill 71 to retreat.

In the second half part of the body cylinder 1, a cylindrical clip support 73 integrally formed with a clip 73a is attached so as to fit in the inner periphery of the body cylinder 1. In the cylindrical clip support 73, a heart cam rotor 74 and a rotor support 75 including a contactor which makes contact with the heart cam provided in the heart cam rotor 74 are arranged. The heart cam rotor 74 and the rotor support 75 constitute a knock-type feeding mechanism 76. The knock-type feeding mechanism 76 will be described later with reference to FIGS. 28 to 30.

The rotor support 75 is fitted in the cylindrical clip support 73. The front end portion of the heart cam rotor 74 positioned in the rotor support 75 abuts the rear end portion of the ballpoint pen refill 71. Thus, the heart cam rotor 74 is biased by the return coil spring 72 via the ballpoint pen refill 71 to retreat.

Further, the rear end portion of the heart cam rotor 74 is covered with a knock cover 77. The knock cover 77 is configured such that the flange formed on the knock cover 77 axially abuts a portion of the inner periphery of the clip support 73 so that the knock cover 77 will not come off.

Figure 28:
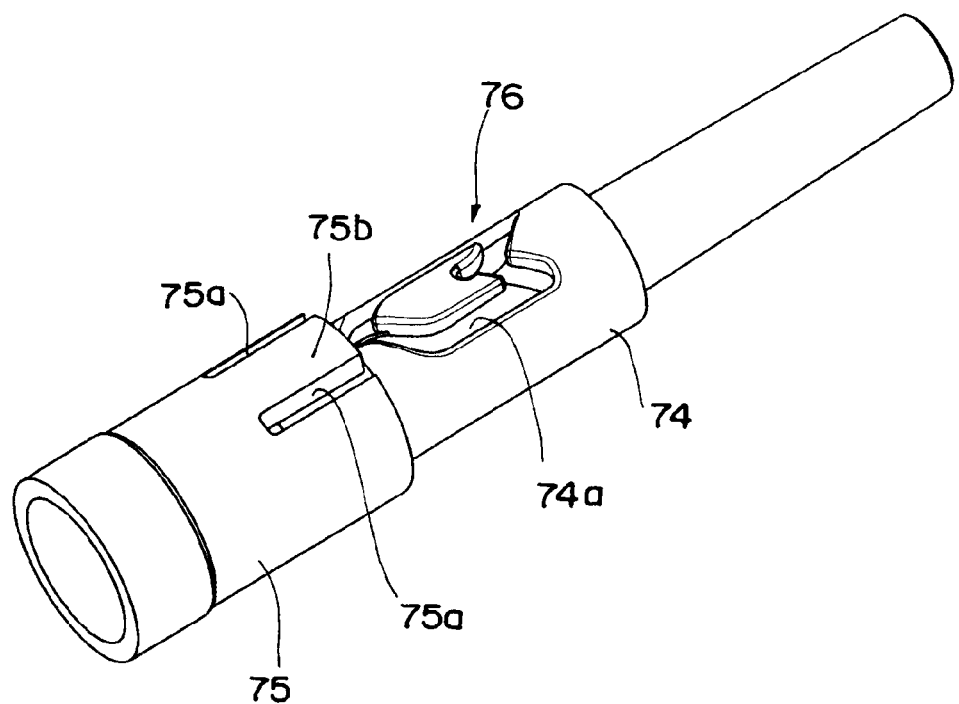
FIG. 28 is a perspective view of a configuration of a knock-type feeding mechanism used in the knock-type ballpoint pen illustrated in FIG. 27.
Figure 29:
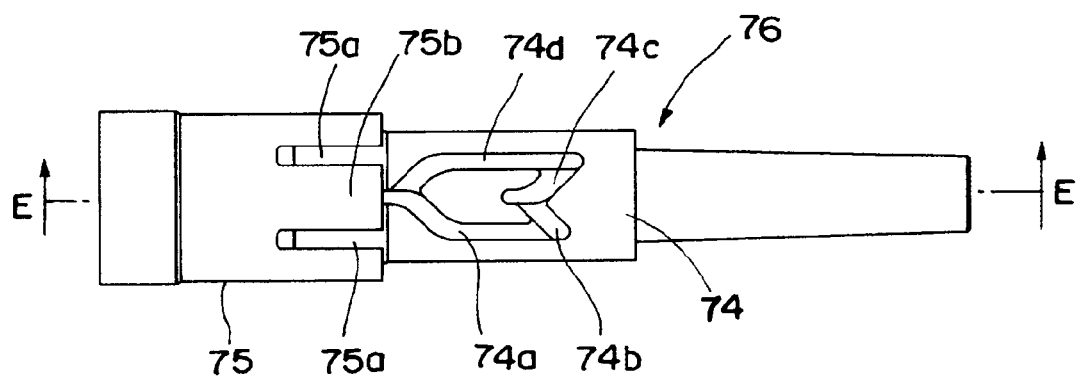
FIG. 29 is a front view similarly illustrating the knock-type feeding mechanism.
Figure 30:
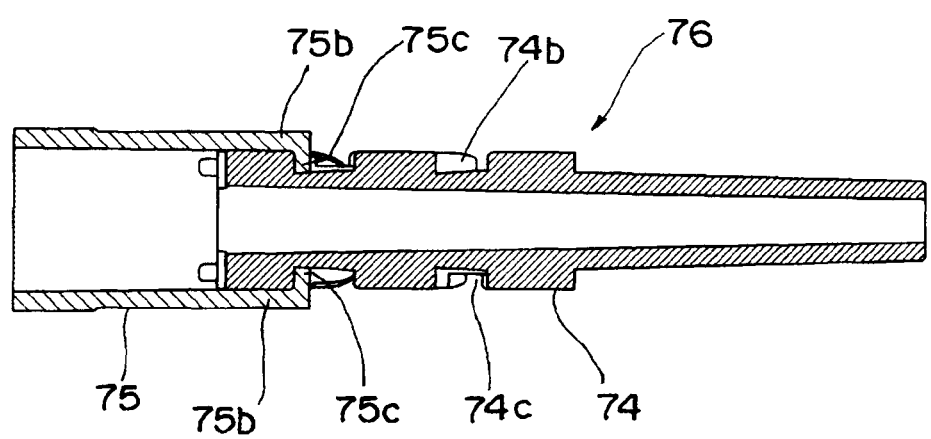
FIG. 30 is a sectional view taken in the direction of the arrow along the line E-E in FIG. 29.

The knock-type feeding mechanism 76 illustrated in FIGS. 28 to 30 is configured with the heart cam rotor 74 and the rotor support 75 as described above.

At symmetrical locations about the axis on the cylindrical face of the heart cam rotor 74, that is, at locations on the cylindrical face parted by 180 degrees, a circuit of grooves 74a to 74d of the heart cam is formed.

The depth of the groove constituting the heart cam becomes shallower from the groove 74a toward the groove 74b and deep again at the groove 74b, as illustrated in FIG. 29. Each of the routes from the groove 74b to the groove 74c, from the groove 74c to the groove 74d, and from the groove 74d to the groove 74a has a similar profile.

Further in the rotor support 75, a pair of cut grooves 75a is cut from the end to form a flexible region 75b. At the end portion of the region 75b, a contactor 75c projecting toward the axis is formed as illustrated in FIG. 30. That is, the contactor 75c is configured to be positioned in the grooves 74a to 74d of the heart cam formed in the heart cam rotor 74.

As for the ballpoint pen illustrated in FIG. 27 including the knock-type feeding mechanism, when the knock cover 77 at the tail end portion is knocked, the heart cam rotor 74 and the ballpoint pen refill 71 are pushed forward.

During this operation, the contactor 75c formed on the rotor support 75 which supports the heart cam rotor 74 stays in the grooves 74a to 74d of the heart cam. Therefore, as the heart cam rotor 74 moves in the axial direction, the contactor 75c relatively moves in the grooves 74a to 74d of the heart cam to rotate the heart cam rotor 74 about the axis.

When the knocking of the knock cover 77 stops, the contactor 75c formed on the rotor support 75 engages with the groove 74c of the heart cam. In this manner, the heart cam rotor 74 is kept in the forwardly moved state so that the ballpoint pen tip 71a is kept projected from the base member 3.

Further, by knocking the knock cover 77 again, the heart cam rotor 74 and the ballpoint pen refill 71 retreat by the action of the spring 72, and the contactor 75c formed on the rotor support 75 engages with the groove 74a of the heart cam. As a result, the heart cam rotor 74 retreats, and the ballpoint pen tip 71a retreats into the base member 3.

FIGS. 31A to 31D exemplarily illustrate the forming, by way of resin mold, of the heart cam rotor 74 and the rotor support 75 constituting the knock-type feeding mechanism 76. That is, FIGS. 31A to 31D exemplarily illustrate the two-color molding where the heart cam rotor 74 is a primary molding and the rotor support 75 is a secondary molding.

Figure 31A:
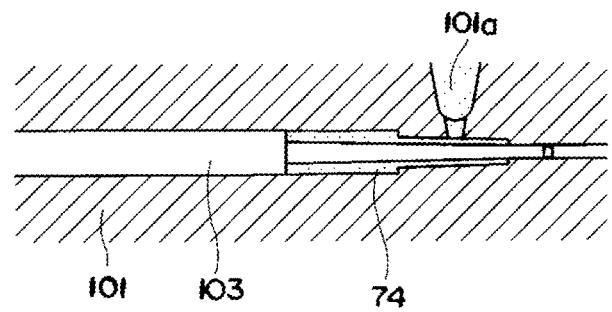
FIGS. 31A to 31D are process drawings exemplarily illustrating the two-color molding of the knock-type feeding mechanism.

FIG. 31A illustrates the heart cam rotor 74 being formed as the primary molding in a cavity formed by a first die 101 and a first core pin 103.

Note that, the first die 101 is configured to open and close in the front-and-rear direction in the figure, and a resin injecting runner 101a is formed in the first die 101.

Thus, the grooves 74a to 74d of the heart cam formed in the heart cam rotor 74 are formed toward the separating direction of the first die 101.

Figure 31B:
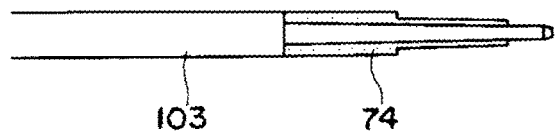

FIG. 31B illustrates the heart cam rotor 74, or the primary molding, separated from the first die 101. The heart cam rotor 74 is attached to the first core pin 103 when separated from the first die 101.

Figure 31C:
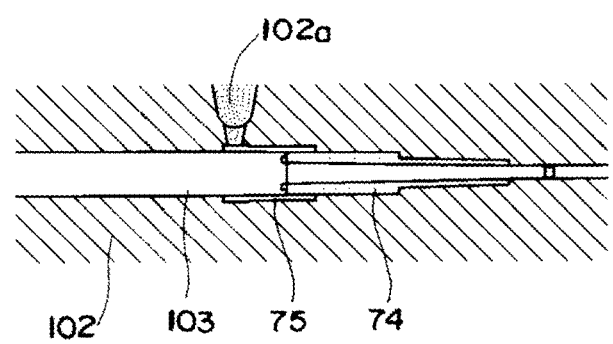

The heart cam rotor 74 formed as the primary molding is accommodated in a second die 102 illustrated in FIG. 31C, and the rotor support 75 is formed as the secondary molding in a cavity formed by the second die 102 and the first core pin 103.

Note that, the second die 102 is also configured to open and close in the front-and-rear direction in the figure, and a resin injecting runner 102a is formed in the second die 102.

When the rotor support 75, or the secondary molding, is formed, the outer shape of the portion of the primarily formed heart cam rotor 74 is used. Particularly, the contactor 75c formed on the rotor support 75 is secondarily formed using a leading portion of the groove 74a of the heart cam.

In this manner, the contactor 75c is formed to project toward the axis as illustrated in FIG. 30.

Figure 31D:
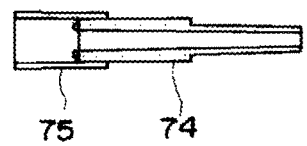

FIG. 31D illustrates the heart cam rotor 74 as the primary molding and the rotor support 75 as the secondary molding, which are separated from the second die 102.

From this state, the heart cam rotor 74 is pushed in the rotor support 75 to separate the contactor 75c, projecting from the rotor support 75, from the heart cam rotor 74 side. Thus, the portion, sliding against the heart cam rotor 74, of the rotor support 75 is formed to have a shape transferred from the sliding portion. In this manner, the clearance between the two moldings can be made as small as possible.

Further, in this embodiment, as already described above, two-color molding is performed to form the heart cam rotor 74 as the primary molding and the rotor support 75 as the secondary molding both desirably using POM.

Figure 32:
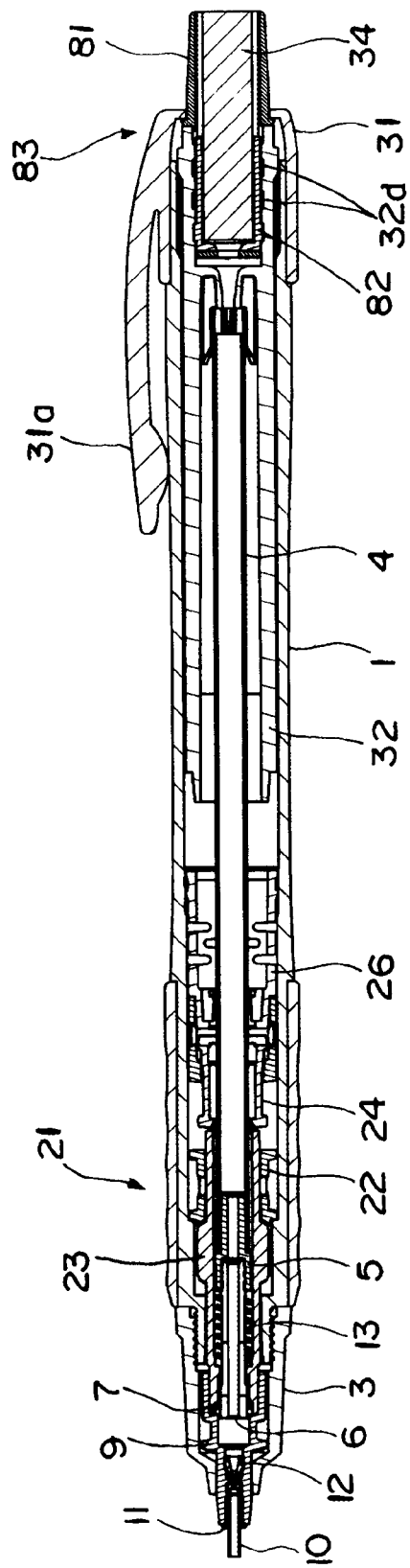
FIG. 32 is a sectional view of a general structure illustrating a second example in which the present invention is applied to a mechanical pencil.

FIG. 32 is a sectional view of a general structure in which the present invention is applied to a second example of a mechanical pencil. Note that, in FIG. 32, parts having the same function as the parts of the mechanical pencil already described with reference to FIGS. 1 to 4 are referred to by the same reference signs. Therefore, detailed description on such parts is omitted.

The second example of the mechanical pencil illustrated in FIG. 32 has the function of the mechanical pencil including the rotational drive mechanism 21 of a writing lead as illustrated in FIGS. 1 to 4 and, in addition, has an eraser receiving unit configured to feed an eraser from the tail end portion.

That is, in the mechanical pencil illustrated in FIG. 32, an eraser feeding thread 32d is spirally formed on the inner periphery of the rear end portion of the knock bar 32 arranged in the rear portion of the body cylinder 1. In the cylindrical space in the knock bar 32 in which the feeding thread 32d is formed, an eraser receiving unit 83 including a feeding knob 81 and an eraser holder 82 is arranged.

As illustrated in FIG. 32, the feeding knob 81 is formed in an approximately cylindrical shape. The tail end portion of the feeding knob 81 projects from the knock bar 32 to function as a knocking part for feeding a writing lead. That is, the writing lead can be fed by knocking the feeding knob 81, similarly to the operation already described with reference to FIGS. 1 to 4.

Figure 33:
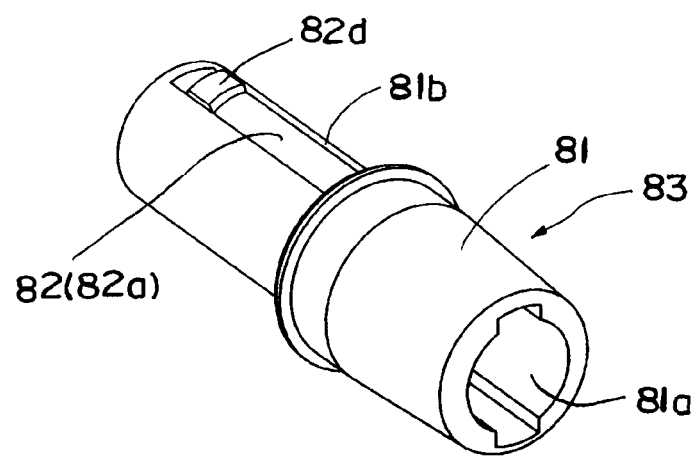
FIG. 33 is a perspective view of an eraser receiving unit mounted on the mechanical pencil illustrated in FIG. 32.
Figure 34:
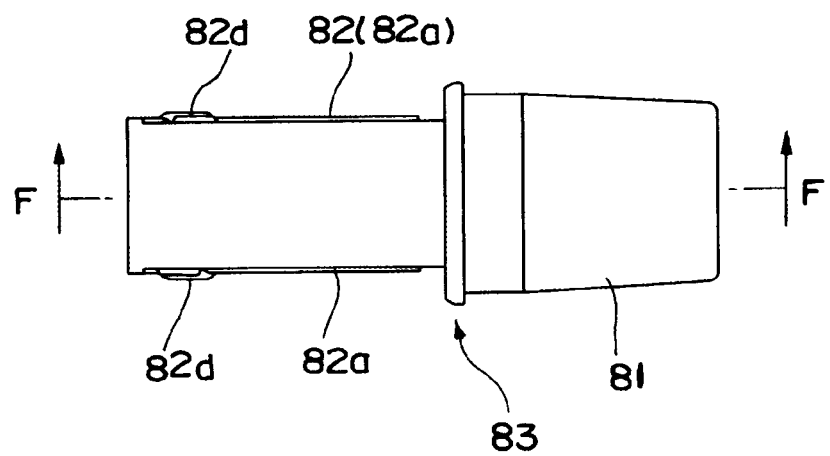
FIG. 34 is a front view similarly illustrating a configuration of the eraser receiving unit.
Figure 35:
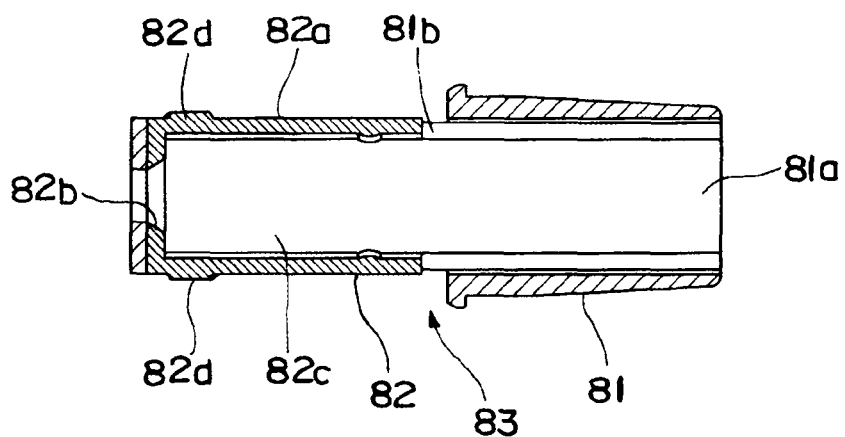
FIG. 35 is a sectional view taken in the direction of the arrow along the line F-F in FIG. 34.

Further, on the end face of the tail end portion of the feeding knob 81, an opening 81a to feed an eraser 34 is formed as illustrated in FIG. 33.

In addition, on the cylindrical face of the first half part of the feeding knob 81, a pair of cut grooves 81b grooved along the axial direction is formed at opposing locations symmetric about the axis.

On the other hand, the eraser holder 82 is formed in an approximately U-shape with two legs 82a configured to be fitted in and slide against the pair of cut grooves 81b formed in the feeding knob 81 and a connecting portion 82b bendingly connected to the two legs 82a at both sides. The central portion 82c between the two legs 82a formed in an approximately U-shape holds the eraser 34.

Thus, the eraser holder 82 is accommodated in the feeding knob 81 so as to slide in the axial direction.

On the two legs 82a of the eraser holder 82, close to the front end portion, a pair of engagement projections 82d each projecting outward is formed. The pair of engagement projections 82d is configured to be screwed in the threaded groove of the feeding thread 32d formed in the knock bar 32 illustrated in FIG. 32.

With the eraser receiving unit 83 assembled in the mechanical pencil as illustrated in FIG. 32, by rotating the feeding knob 81 in one direction about the axis, the eraser holder 82 slidably fitted in the feeding knob 81 also rotates about the axis in the same direction in conjunction with the rotation of the feeding knob 81.

With the eraser holder 82 rotating about the axis, the pair of engagement projections 82d formed on the two legs 82a of the eraser holder 82 screws along the threaded groove of the feeding thread 32d formed in the knock bar 32, whereby the eraser holder 82 moves in the axial direction.

As a result, the eraser 34 mounted on the eraser holder 82 is fed from the opening 81a formed in the feeding knob 81.

Note that, when the eraser 34 is projecting from the opening 81a, by rotating the feeding knob 81 about the axis in the other direction, the eraser 34 can be accommodated in the feeding knob 81 by the reverse action.

FIGS. 36A to 36D exemplarily illustrate the forming, by way of resin mold, of the feeding knob 81 and the eraser holder 82 constituting the eraser receiving unit 83. That is, FIGS. 36A to 36D exemplarily illustrate the two-color molding where the eraser holder 82 is a primary molding and the feeding knob 81 is a secondary molding.

Figure 36A:
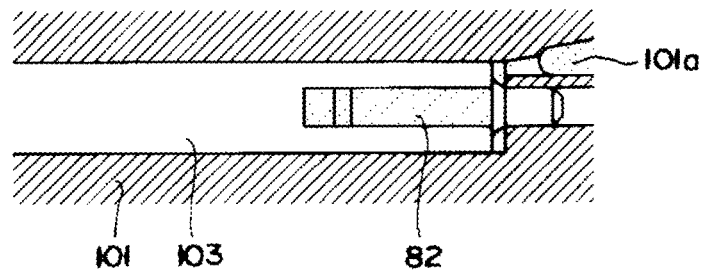
FIGS. 36A to 36D are process drawings exemplarily illustrating the two-color molding of the eraser receiving unit.

FIG. 36A illustrates the eraser holder 82 being formed as the primary molding in a cavity formed by a first die 101 and a first core pin 103.

Note that, the first die 101 is configured to open and close in the front-and-rear direction in the figure, and a resin injecting runner 101a is formed in the first die 101.

Figure 36B:
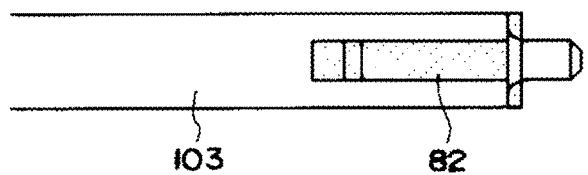

FIG. 36B illustrates the eraser holder 82, or the primary molding, separated from the first die 101. The eraser holder 82 is attached to the first core pin 103 when separated from the first die 101.

Figure 36C:
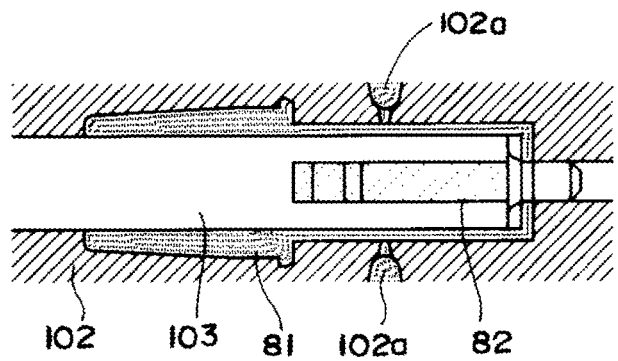

The eraser holder 82 formed as the primary molding is accommodated in a second die 102 illustrated in FIG. 36C, and the feeding knob 81 is formed as the secondary molding in a cavity formed by the second die 102 and the first core pin 103.

Note that, the second die 102 is also configured to open and close in the front-and-rear direction in the figure, and a resin injecting runner 102a is formed in the second die 102.

When the feeding knob 81, or the secondary molding, is formed, the outer shape (both longitudinal edges of each leg 82a) of the pair of legs 82a of the primarily formed eraser holder 82 is used to form the pair of cut grooves 81b along the axial direction. Thus, the pair of cut grooves 81b is formed to have an outer shape transferred from the pair of legs 82a formed on the eraser holder 82. In this manner, the clearance between the two moldings can be made as small as possible.

Figure 36D:
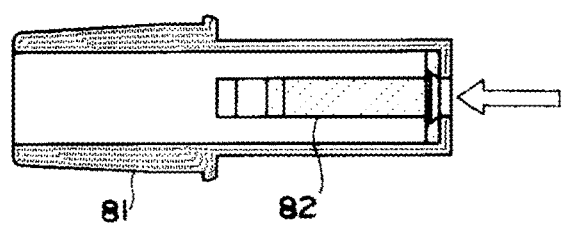

FIG. 36D illustrates the eraser holder 82 as the primary molding and the feeding knob 81 as the secondary molding, which are separated from the second die 102.

From this state, a push rod serving as a jig (not shown) is pushed in the direction shown in the arrow in FIG. 36D to separate the eraser holder 82 from the feeding knob 81. As a result, the eraser receiving unit 83 having the feeding knob 81 slidably accommodating the eraser holder 82 can be obtained.

Further, in this embodiment, as already described above, two-color molding is performed to form the eraser holder 82 as the primary molding and the feeding knob 81 as the secondary molding both preferably using POM.

Figure 37:
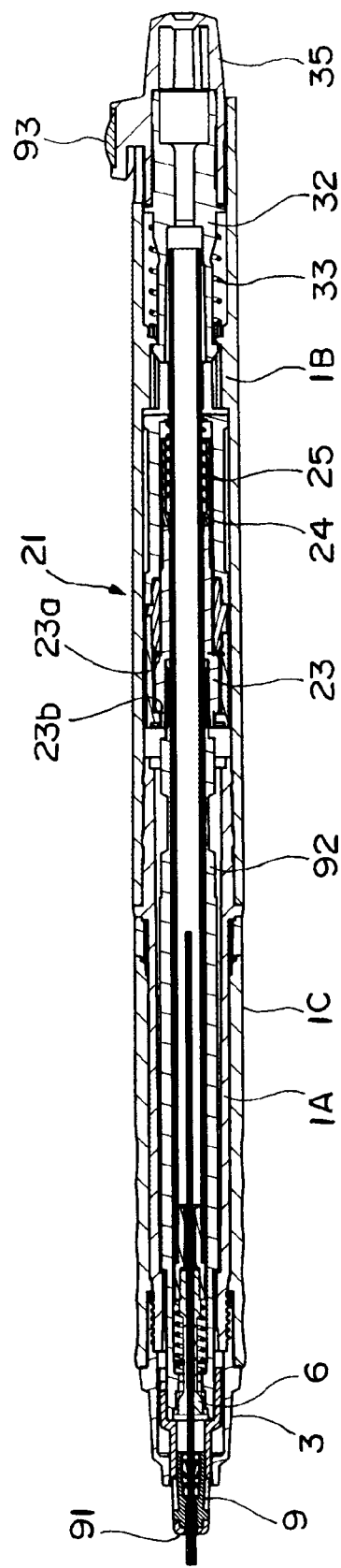
FIG. 37 is a sectional view of a general structure illustrating a third example in which the present invention is applied to a mechanical pencil.
Figure 38:
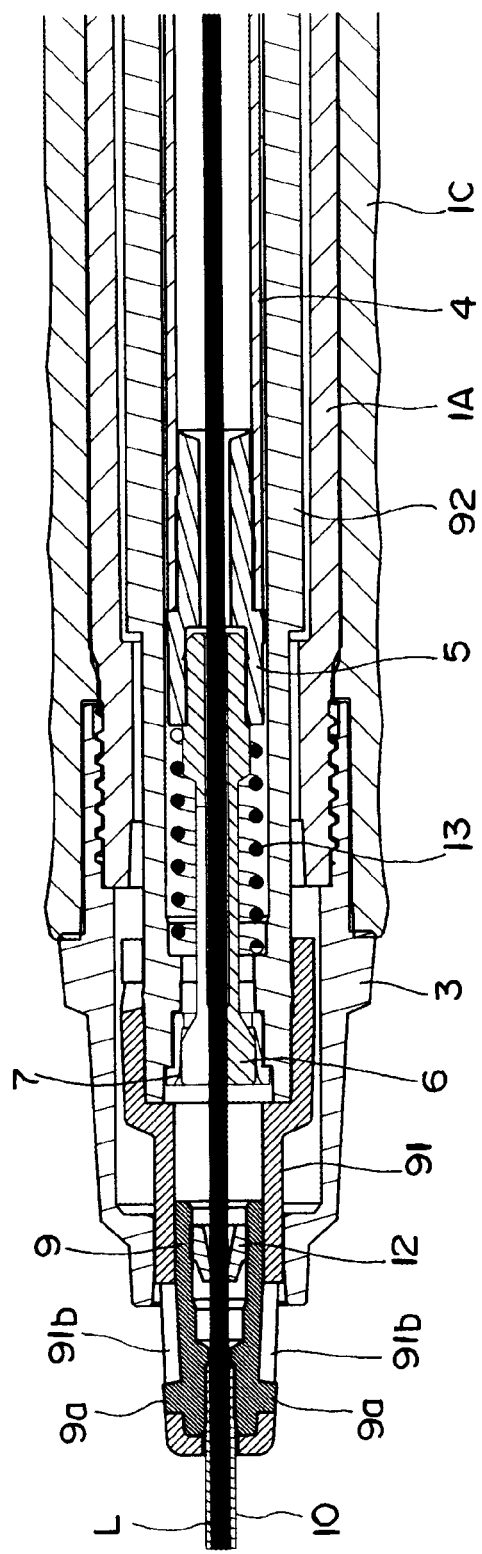
FIG. 38 is an enlarged sectional view of a first half part of the mechanical pencil illustrated in FIG. 37.

FIGS. 37 and 38 are sectional views of a general structure and a first half part, respectively, illustrating a third example in which the present invention is applied to a mechanical pencil. Note that, in FIGS. 37 and 38, parts having the same function as the parts of the mechanical pencil already described with reference to FIGS. 1 to 4 are referred to by the same reference signs. Therefore, detailed description on such parts is omitted.

The mechanical pencil illustrated in FIG. 37 has the function of the mechanical pencil including the rotational drive mechanism 21 of a writing lead as illustrated in FIGS. 1 to 4 and, in addition, is configured to accommodate a pipe end in a slider cover as required.

The mechanical pencil illustrated in FIGS. 37 and 38 has a body cylinder configured by linearly coupling a front body 1A and a rear body 1B at the central portion. Further, a grip 1C made of soft rubber is attached to the front body 1A while surrounding the front body 1A.

In the embodiment, a rotational drive mechanism 21 of a writing lead is arranged on the side of the rear body 1B, and the rotational drive mechanism 21 and the chuck 6 are coupled via a connection pipe 92. Further, to the rear body 1B, a decorating badge 93 is attached instead of a clip.

Furthermore, in this embodiment, as illustrated in enlargement in FIG. 38, a slider cover 91 slidably supporting the slider 9 in the axial direction is fitted in the front end portion of the connection pipe 92.

A certain region of the first half part of the slider cover 91 is formed to have an approximately constant inner diameter in the axial direction. The slider 9 attached with a pipe end 10 is accommodated in the slider cover 91 to slide in the axial direction.

In the center of the front end portion of the slider cover 91, an opening 91a from which the pipe end 10 projects is formed, as illustrated in FIGS. 39A to 45.

Further, in the peripheral face of the slider cover 91, a pair of guide grooves 91b is formed, in the axial direction, at locations symmetric about the axis. On the slider 9, a pair of projections 9a, each moving along in one of the pair of guide grooves 91b, is formed outward at locations symmetric about the axis.

That is, the slider 9 and the slider cover 91 are configured to mutually slide but not to separate from each other. In this manner, the slider 9 with the pipe end 10 is prevented from coming off.

Further, with the projection 9a formed on the slider 9 and the guide groove 91b formed in the slider cover 91, the slider 9 will not spin when writing is performed with a writing lead remaining.

Figure 39A:
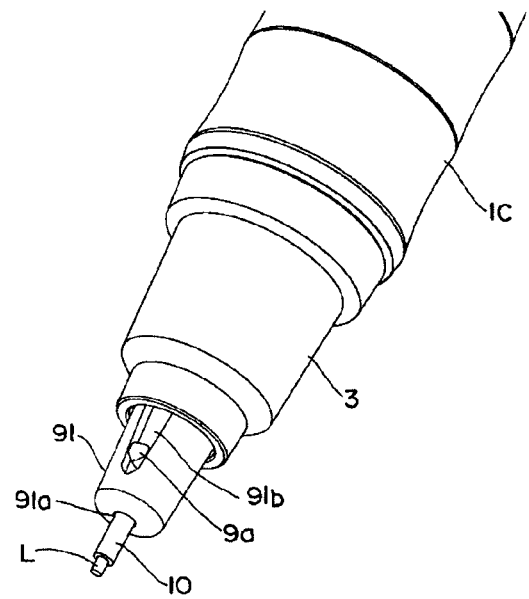
FIG. 39A is a perspective view where a pipe end is projected.
Figure 39B:
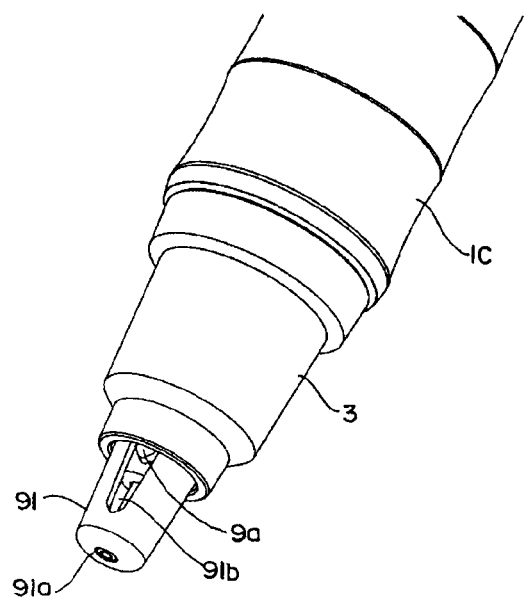
FIG. 39B is a perspective view where a pipe end is accommodated.

FIG. 39A illustrates a state where the slider 9 accommodated in the slider cover 91 has moved forward. FIG. 39B illustrates a state where the slider 9 has retreated.

That is, when the slider 9 is in a retreat state, the pipe end 10 attached to the slider 9 is accommodated in the slider cover 91. In this manner, accidents such as injury with the projected pipe end 10 can be avoided when not in use.

To retreat the pipe end 10 as illustrated in FIG. 39B, a knock cover 35 is knocked to release the chuck 6, and with this chuck 6 released, the pipe end 10 is pushed into the slider cover 91 by a fingertip or the like. As a result, the pipe end 10 retreats together with the writing lead L.

To move the pipe end 10 forward as illustrated in FIG. 39A, the knock cover 35 is knocked to move the chuck 6 forward, and the tip portion of the chuck 6 pushes the slider 9 forward within the slider cover 91. Thus, the pipe end 10 attached to the slider 9 also moves forward within the slider cover 91 and projects in front of the slider cover 91 to be in a state illustrated in FIG. 39A.

As illustrated in FIG. 39A, when the slider 9 has moved forward to allow writing, the cushion operation by the writing rotationally drives the rotational drive mechanism 21. In conjunction with this, the slider cover 91 projecting from the base member 3 is also rotationally driven with the rotating writing lead L.

Since the slider cover 91 stays in front of a material to write on, such as a paper, a writer can easily recognize the rotation of the slider cover 91 when writing. Moreover, since the projection 9a formed on the slider 9 projects from the guide groove 91b formed in the slider cover 91 as illustrated in FIG. 39A, the rotating motion of the projection 9a and the guide groove 91b can surely be monitored.

Figure 41:
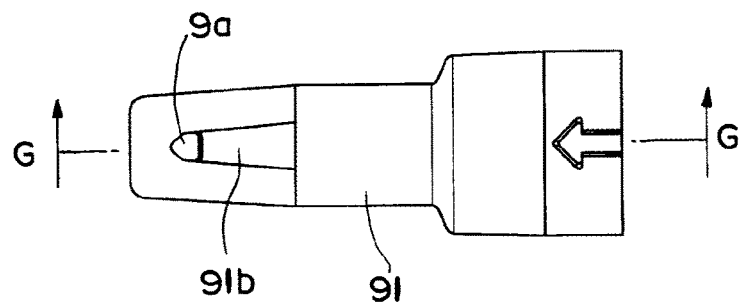
FIG. 41 is a front view of the slider cover.
Figure 42:
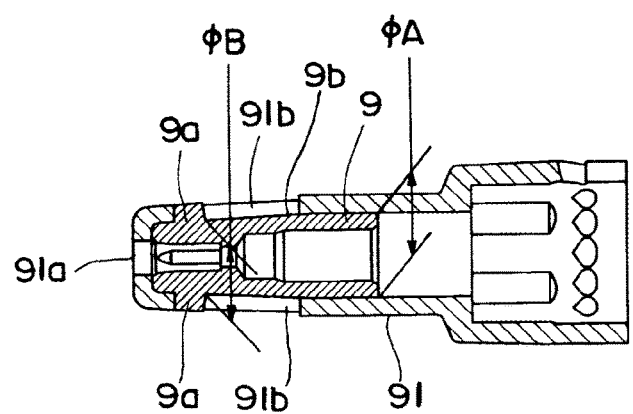
FIG. 42 is a sectional view taken in the direction of the arrow along the line G-G in FIG. 41.
Figure 43:
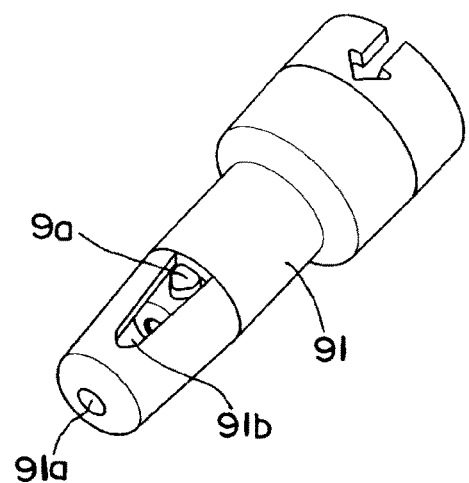
FIG. 43 is a perspective view of the slider cover with the slider retracted.
Figure 44:
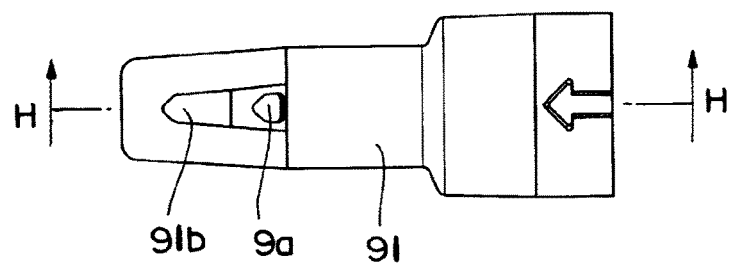
FIG. 44 is a front view of the slider cover in the same state.
Figure 45:
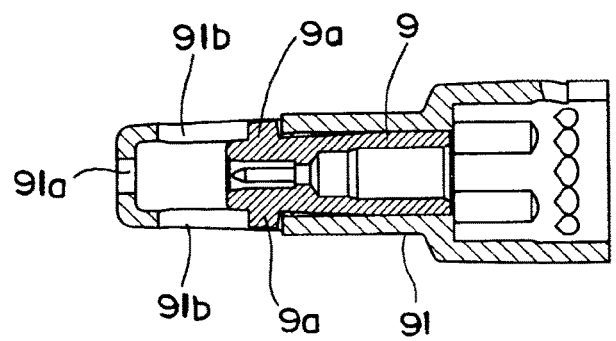
FIG. 45 is a sectional view taken in the direction of the arrow along the line H-H in FIG. 44.
Figure 46A:
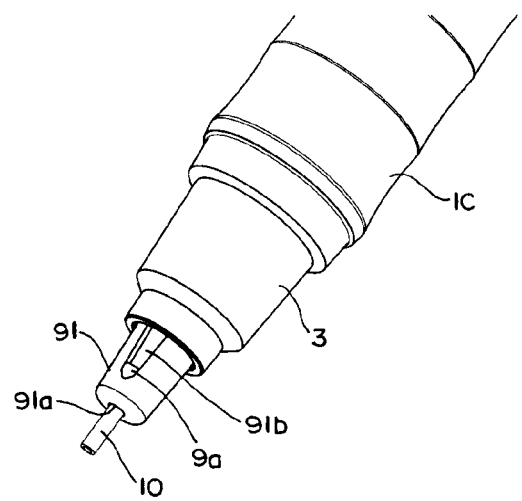
FIG. 46A is a perspective view where the slider is configured to have a larger size of the body toward the rear end, with a pipe end being projected.
Figure 46B:
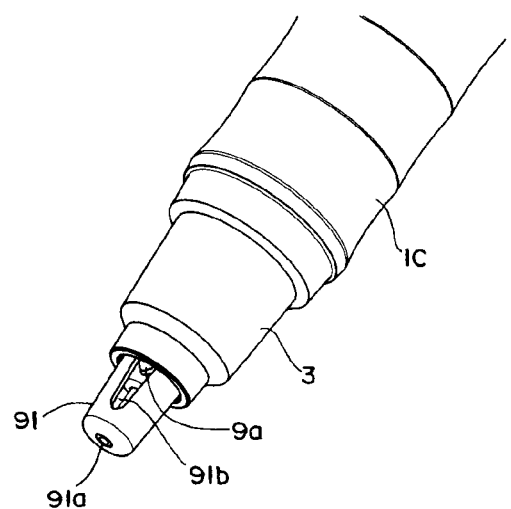
FIG. 46B is a perspective view where the slider is configured to have a larger size of the body toward the rear end, with the pipe end being retracted.

As illustrated in FIG. 42, when dimensions of a body portion 9b of the slider 9 are configured to have the relationship of φA>φB (for example, φA−φB=φ0.1 to 1.0 mm) where φA is a rear end outer diameter and φB is a front end outer diameter, the slider 9 and the pipe end 10 can fall downward, not only by a pushing force of the chuck 6, but by their own weights when the mechanical pencil is pointed downward and knocked. By using the own weight to fall downward, as illustrated in FIGS. 40 to 42, 46A, and 46B, the slider 9 can move forward to the forward limit of the slider which is farther front than the forward limit of the chuck 6.

Thus, the projecting length of the pipe end 10 can be increased, and writing can be performed without knocking until the pipe end 10 retreats to the retreat limit of the pipe end 10. During the writing, the writer will not feel the pipe end 10 dragging a paper.

Further, in this embodiment, each of the pair of guide grooves 91b formed in the slider cover 91 has a tapered shape in which the width of the groove gradually decreases toward the tip portion of the slider cover 91.

Figure 40:
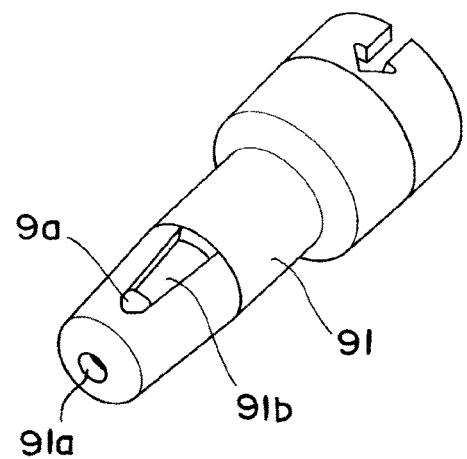
FIG. 40 is a perspective view of a slider cover with a slider installed therein.

Thus, when the slider 9 has moved forward as illustrated in FIGS. 40 to 42, the pair of projections 9a formed close to the front end portion of the slider 9 is positioned at the tip portion of the taper-shaped guide groove 91b formed in the slider cover 91. In this manner, the slider 9 and the slider cover 91 are positioned with small clearance.

In this state, the rear end portion side of the slider 9 is located at the portion of the slider cover 91 where the inner diameter is approximately the same along the axial direction, that is, at the location where the clearance between the slider 9 and the slider cover 91 is small. With such a configuration, a play (looseness) of the pipe end 10 during writing operation can be reduced, thereby improving the feeling of writing.

As described above, in the configuration allowing the slider 9 to move forward and retreat in the slider cover 91, it is particularly important to set the amount of play (looseness) between the slider 9 and the slider cover 91 to be small when the slider 9 is in the forwardly moved state for writing. This can be achieved by using two-color molding as illustrated in FIGS. 47A to 47D.

FIGS. 47A to 47D exemplarily illustrate the forming, by way of resin mold, of the slider 9 and the slider cover 91. That is, FIGS. 47A to 47D exemplarily illustrate the two-color molding where the slider 9 is a primary molding and the slider cover 91 is a secondary molding.

Figure 47A:
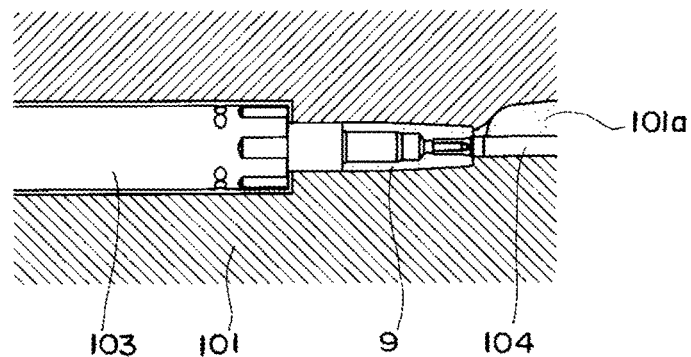
FIGS. 47A to 47D are process drawings exemplarily illustrating the two-color molding of the slider cover performed on the slider.

FIG. 47A illustrates the slider 9 being formed as the primary molding in a cavity formed by a first die 101, a first core pin 103, and a second core pin 104.

Note that, the first die 101 is configured to open and close in the front-and-rear direction in the figure, and a resin injecting runner 101a is formed in the first die 101.

Figure 47B:
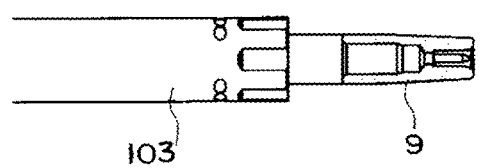

FIG. 47B illustrates the slider 9, or the primary molding, separated from the first die 101. The slider 9 is attached to the first core pin 103 when separated from the first die 101.

Figure 47C:
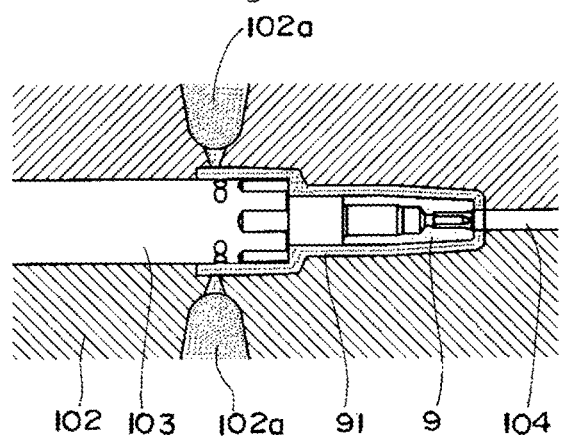

The slider 9 formed as the primary molding is accommodated in a second die 102 illustrated in FIG. 47C, and the slider cover 91 is formed as the secondary molding in a cavity formed by the second die 102, the first core pin 103, and the second core pin 104.

Note that, the second die 102 is also configured to open and close in the front-and-rear direction in the figure, and a resin injecting runner 102a is formed in the second die 102.

It is preferable that the slider cover 91 be molded as the secondary molding with the primarily formed slider 9 positioned in the forwardly moved state in the slider cover 91 as illustrated in FIG. 47C. In this manner, the slider cover 91 is formed to have a columnar shape in the inner side which is transferred from the outer shape of the slider 9. As a result, the two moldings can be formed with as small a clearance therebetween as possible as will be described below.

Figure 47D:
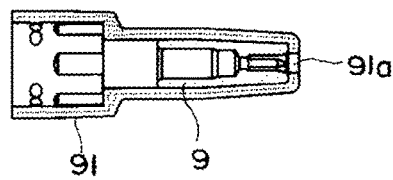

FIG. 47D illustrates the slider 9 as the primary molding and the slider cover 91 as the secondary molding, which are separated from the second die 102.

From this state, for example, the pipe end 10 is inserted from the opening 91a formed in the slider cover 91 toward the slider 9 to be press fit. At the same time, the slider 9 can be separated in the slider cover 91 in the axial direction.

Also in this embodiment, as already described above, two-color molding is performed to form the slider 9 as the primary molding and the slider cover 91 as the secondary molding both desirably using POM.

In the embodiment described above, by forming the slider 9 and the slider cover 91 using two-color molding with the slider 9 positioned in the forwardly moved state, the clearance between the slider 9 and the slider cover 91 can be made as small as possible. Thus, when such embodiment is assembled as a mechanical pencil product, the looseness or the like of the pipe end 10 during writing can almost be eliminated, and such effect will improve the feeling of writing when using the mechanical pencil.

Note that, a primary molding and a secondary molding in two-color molding described above are not necessarily formed in a specific order as illustrated in the drawings. Even when the forming order of the primary molding and the secondary molding is switched, a writing instrument or an applicator having a similar effect can be obtained. Further, the present invention can be applied not only to two-color molding but also to three-color or multi-color molding to obtain a writing instrument or an applicator having a similar effect.

What is claimed is:

1. A writing instrument or an applicator, configured as a mechanical pencil including a rotational drive mechanism for rotationally driving a rotatable cam based on writing pressure that a writing lead receives and configured to transmit rotational motion of the rotatable cam to the writing lead,
    wherein the rotational drive mechanism includes a holder member configured to rotatably and axially movably support the rotatable cam and a sliding member that is fitted in the holder member and configured to axially push the rotatable cam forward,
    the rotational drive mechanism is also configured to rotate the rotatable cam by axially moving the rotatable cam based on writing pressure that the writing lead receives,
    on the holder member, a columnar piece that functions as an axially long guide protrusion is formed and on the sliding member, a guide portion that functions as a guide recess corresponding to the columnar piece is formed, so as to fit the sliding member slidably in the columnar piece, and
    a cushion spring configured to produce a bias force to axially push the rotatable cam forward is arranged making contact with the sliding member.

2. The writing instrument or the applicator according to claim 1, wherein the holder member and the sliding member are formed by way of resin molding.

3. The writing instrument or the applicator according to claim 1, wherein a plurality of columnar pieces formed on the holder member is arranged so as to surround the sliding member in the center, and in a portion in the longitudinal direction of each columnar piece, a step portion is formed to reduce the width in the circumferential direction of the columnar piece.

4. The writing instrument or the applicator according to claim 1, wherein a plurality of columnar pieces formed on the holder member is arranged so as to surround the sliding member in the center, and each columnar piece is formed to have a tapered shape reducing the width in the circumferential direction rearward along the axial direction of the columnar piece.

5. The writing instrument or the applicator according to claim 1, wherein a plurality of columnar pieces formed on the holder member is arranged so as to surround the sliding member in the center, and each columnar piece is formed in a tapered shape so as the inner distance between the opposing columnar pieces increases rearward along the axial direction of the columnar piece.

\* \* \* \* \*